(12) United States Patent
Clarkson et al.

(10) Patent No.: US 9,627,839 B2
(45) Date of Patent: Apr. 18, 2017

(54) OPTICAL FIBER LASERS

(75) Inventors: William Andrew Clarkson, Southampton (GB); Rafal Cieslak, Southampton (GB)

(73) Assignee: UNIVERSITY OF SOUTHAMPTON, Hampshire (GB)

( * ) Notice: Subject to any disclaimer, the term of this patent is extended or adjusted under 35 U.S.C. 154(b) by 259 days.

(21) Appl. No.: 13/981,440

(22) PCT Filed: May 13, 2011

(86) PCT No.: PCT/GB2011/000742
§ 371 (c)(1),
(2), (4) Date: Oct. 7, 2013

(87) PCT Pub. No.: WO2012/101391
PCT Pub. Date: Aug. 2, 2012

(65) Prior Publication Data
US 2014/0023098 A1  Jan. 23, 2014

(30) Foreign Application Priority Data

Jan. 24, 2011  (GB) .................................. 1101187.1

(51) Int. Cl.
*H01S 3/08*  (2006.01)
*H01S 3/067*  (2006.01)
(Continued)

(52) U.S. Cl.
CPC ................ *H01S 3/08* (2013.01); *H01S 3/067* (2013.01); *H01S 3/0675* (2013.01); *H01S 3/07* (2013.01);
(Continued)

(58) Field of Classification Search
CPC .................. H01S 3/0092; H01S 3/082–3/0826
See application file for complete search history.

(56) References Cited

U.S. PATENT DOCUMENTS 5,946,129 A * 8/1999 Xu et al. ........................ 359/332
2004/0086019 A1 5/2004 Kim et al.
(Continued)

FOREIGN PATENT DOCUMENTS

EP  1 146 612 A1  4/2000

OTHER PUBLICATIONS

International Search Report for PCT Application No. PCT/GB2011/000742 dated Apr. 4, 2012.
(Continued)

*Primary Examiner* — Joshua King
(74) *Attorney, Agent, or Firm* — Renner, Otto, Boisselle & Sklar, LLP

(57) ABSTRACT

A fiber gain medium provided by a rare-earth doped fiber (10) is contained in a first resonant cavity by end reflectors (12, 18). The reflector (12) is wavelength selective to limit the frequency band of the first resonant cavity. The first resonant cavity also contains a second resonant enhancement cavity (16) with multiple transmission bands lying within the first resonant cavity's frequency band. Multiple standing wave modes of the first resonant cavity lie within both the frequency band of the first resonant cavity and the transmission bands of the second resonant cavity, and it is these standing wave modes that support laser action when the rare-earth doped fiber is suitably pumped by pump lasers (40).

13 Claims, 20 Drawing Sheets

(51) Int. Cl.
H01S 3/07 (2006.01)
H01S 3/082 (2006.01)
H01S 3/108 (2006.01)
H01S 3/109 (2006.01)
G02F 1/35 (2006.01)
H01S 3/06 (2006.01)
H01S 3/094 (2006.01)

(52) U.S. Cl.
CPC .......... H01S 3/0826 (2013.01); H01S 3/109 (2013.01); H01S 3/1083 (2013.01); H01S 3/1086 (2013.01); G02F 2001/3542 (2013.01); H01S 3/0604 (2013.01); H01S 3/06791 (2013.01); H01S 3/08022 (2013.01); H01S 3/094042 (2013.01); H01S 3/094084 (2013.01)

(56) References Cited

U.S. PATENT DOCUMENTS

| | | | |
|---|---|---|---|
| 2007/0041409 A1* | 2/2007 | Sudarshanam et al. | 372/6 |
| 2009/0086787 A1 | 4/2009 | Chi et al. | |
| 2009/0285246 A1 | 11/2009 | Seo et al. | |
| 2009/0316732 A1 | 12/2009 | Metivier et al. | |

OTHER PUBLICATIONS

Written Opinion for PCT Application No. PCT/GB2011/000742.
Search Report for corresponding UK Application No. GB1101187.1 dated May 20, 2011.
G.D. Boyd, "Parametric interaction of focused Gaussian light beams", 1968.
L. McDonagh, "Low-noise 62 W CW intracavity-doubled TEM00 Nd:YVO4 green laser pumped at 888 nm", 2007.
S. Popov, "7: Fiber laser overview and medical applications", 2009.
S.I. Kablukov, "Frequency doubling of Yb-doped fiber laser to 515 nm", 2010.
Ashkin, "Resonant optical second harmonic generation and mixing", 1966.
T. Sudmeyer, "Efficient $2^{nd}$ and $4^{th}$ harmonic generation of a single-frequency continuous-wave fiber amplifier", 2008.
W. J. Kozlovsky, "Blue light generation by resonator-enhanced frequency doubling of an extended-cavity diode laser", 1994.
P. G. Wigley, "High-power 467-nm passively locked signal-resonant sum-frequency laser", 1995.
J. Koplow, "Single-mode operation of a coiled multi-mode fiber amplifier", 2000.
M. Fermann, "Single-mode excitation of multi-mode fibers with ultrashort pulses", 1998.
R. Cieslak, "Efficient intracavity frequency doubling of an Yb-doped fiber laser using an internal resonant enhancement cavity", 2010.
R. Cieslak, "Wavelength tunable internally-frequency-doubled Yb-doped fiber laser", 2010.
R. Cieslak, "Power scalable internal frequency doubling scheme for continuous wave fiber lasers", 2011.
V. Baby, "Continuous-Wave Operation 1-6.12 of Semiconductor Optical Amplifier-Based Multiwavelength Tunable Fiber Lasers With 25-GHz Spacing", 2007.

* cited by examiner

OPTICAL FIBER LASERS

This application is a national phase of International Application No. PCT/GB2011/000742 filed May 13, 2011 and published in the English language.

BACKGROUND OF THE INVENTION

The invention relates to optical fiber lasers, and in particular continuous wave operation optical fiber lasers.

Many applications require coherent laser emission in wavelength regimes (e.g. ultraviolet, visible and mid-infrared) that are not readily accessible by conventional diode-pumped solid-state lasers and fiber lasers. The most popular way to reach these wavelength regimes is via nonlinear frequency conversion (e.g. second harmonic generation, sum-frequency generation, difference-frequency generation, optical parametric generation) of near-infrared laser emission from solid-state lasers and/or fiber lasers. The efficiency of each nonlinear frequency conversion process strongly depends on the optical power of the interacting beams [1]. Simple single-pass nonlinear frequency conversion in a suitable nonlinear crystal is a popular approach for high peak power pulsed laser sources, but is generally not very effective with lasers operating in continuous-wave (cw) mode as cw power levels are limited. One way to overcome this problem is to exploit the high intracavity powers that can be achieved in bulk solid-state lasers for efficient nonlinear frequency conversion. This approach is best known in the context of intracavity second harmonic generation and has become the standard method for producing multiwatt visible (green) output from neodymium-doped and ytterbium-doped solid-state lasers operating in the ~1 μm wavelength regime. The success of this approach is largely due to the ability to construct solid-state laser resonators with very low round-trip cavity loss as this is a prerequisite for high intracavity power. As a result, intracavity frequency doubling of diode-pumped bulk solid-state lasers remains the most popular approach for generating multi-watt level, single spatial mode, continuous-wave laser radiation in the visible spectral region [2]. Unfortunately, power levels in conventional solid-state lasers are limited by thermal effects, which degrade efficiency and beam quality as pump power is increased. Indeed, thermal effects can be especially detrimental to the performance of intracavity frequency-doubled solid-state lasers by virtue of the increased cavity loss associated with thermally-induced phase distortion. As a consequence, this approach is generally limited to output power levels around a few tens-of-watts. A further drawback of solid-state laser gain media is that the emission bands tend to be quite narrow limiting the range of operating wavelengths.

In contrast, fiber lasers benefit from a geometry that offers a high degree of immunity from the effects of heat generation in the core. Waste heat generated by the laser pumping cycle is distributed over a long device length facilitating heat sinking and reducing the risk of thermally-induced damage. Moreover, the output beam quality is determined mainly by the waveguiding properties of the active-ion-doped core, which can be tailored to produce a single-spatial-mode output. As a consequence, fiber-based laser sources can be scaled to very high power levels (e.g. by using a cladding-pumped fiber architecture), whilst maintaining good beam quality and high efficiency. Indeed, recent advances in cladding-pumped fiber laser technology have been dramatic yielding multi-kilowatt, single-spatial-mode cw output in the ~1 μm spectral region from ytterbium-doped fiber lasers [3]. A further attraction of fiber gain media is that the emission bands tend to be quite broad (as a consequence of the glass host) giving flexibility in operating wavelength. Thus fiber lasers also offer the prospect of high cw power in other wavelength regimes (e.g. UV, visible, mid-infrared).

Unfortunately, intracavity nonlinear frequency conversion schemes are not well suited for fiber lasers because of their relatively high resonator loss. As a result, the intracavity power attainable is generally not much higher than the output power that can be achieved with the optimum output coupling transmission, and hence there is only a small improvement in nonlinear frequency conversion efficiency compared to a simple single-pass conversion scheme [4]. One solution to this problem is to employ an external (to the laser) resonant enhancement cavity [5]. In this approach, the output power from the laser is enhanced via resonance in a low-loss external cavity, thereby avoiding the limitations associated with the high internal losses in the fiber source. This approach has been successfully applied to CW fiber-based sources for frequency doubling [6], but suffers from the drawback of added complexity since a single-frequency fiber master-oscillator power-amplifier (MOPA) is required, and precise control and active stabilization of the master-oscillator cavity length and/or resonant cavity length is needed to ensure that the resonance condition is maintained at all times. Furthermore, the output power available from the single-frequency MOPA, and hence the frequency doubled power is strongly limited by stimulated Brillouin scattering (SBS) in the amplifier fiber.

SUMMARY OF THE INVENTION

The invention provides a device comprising:
a portion of optical fiber providing an amplifying medium;
a first resonant cavity containing the portion of optical fiber and having a frequency selective element which limits the frequency band of the first resonant cavity to cover a subset of standing wave modes of the first resonant cavity;
a second resonant cavity arranged in the first resonant cavity and having a transmission response that includes a plurality of transmission bands within the frequency band of the first resonant cavity, so that there are a plurality of standing wave modes which lie within both the frequency band of the first resonant cavity and at least two of the transmission bands of the second resonant cavity; and
a pump source having an output directed to excite optical emission within the first frequency band from the amplifying medium and induce lasing at multiple ones of said plurality of standing wave modes that lie within both the frequency band of the first resonant cavity and the transmission bands of the second resonant cavity.

In one set of embodiments, the first resonant cavity is a linear, or standing wave, cavity bounded by a first reflector and a second reflector. In another set of embodiments, the first resonant cavity is a ring cavity.

The frequency selective element may comprise a grating or a filter. A grating would typically operate in reflection, whereas a filter may operate in reflection or transmission.

The most straightforward implementations are based on using a section of single mode optical fiber as the gain medium. However, several embodiments incorporate multi-mode optical fiber, i.e. fiber having a fundamental mode and at least one higher order mode.

To incorporate multi-mode optical fiber, one option is that the first resonant cavity is a linear cavity bounded by a first reflector and a second reflector, the first reflector being a fiber Bragg grating written into the optical fiber and having a mode-dependent effective period, and the second reflector being a volume Bragg grating having a period matched to the effective period of the fiber Bragg grating for the fundamental mode so that lasing is restricted to the fundamental mode. Effective period is the product of effective refractive index and actual period.

To incorporate multi-mode optical fiber, another option is that the multi-mode output of the optical fiber at the end optically adjacent to the second resonant cavity is spatially matched to the fundamental transverse mode $TEM_{00}$ of the second resonant cavity so that the first resonant cavity is resonant for multi-mode amplification in the optical fiber.

Still further options for incorporating multi-mode fiber are based on the conventional techniques of tapering or bending to suppress lasing in the higher order modes.

Devices according to the invention can support a variety of frequency mixing processes by the second resonant cavity having arranged therein a non-linear optical medium which supports a frequency mixing process in the second resonant cavity.

Frequency mixing processes that are implementable with the device include second harmonic generation (SHG), sum frequency generation (SFG), third harmonic generation (THG), fourth harmonic generation (FHG), difference frequency generation (DFG) and optical parametric oscillation (OPO). Without the non-linear optical medium, the second resonant cavity serves solely to stabilize the output. With the non-linear optical medium, the device acts as a frequency mixing element.

Most if not all the typical frequency mixing processes can be supported by different example implementations. Several are now briefly summarized.

The second resonant cavity can have arranged therein a non-linear optical medium which supports generation of the second harmonic of the optical radiation resonated in the second resonant cavity.

The second resonant cavity can have arranged therein a further non-linear optical medium which supports generation of a third or fourth harmonic of the optical radiation resonated in the second resonant cavity.

The second resonant cavity can be configured as an optical parametric oscillator having arranged therein a non-linear optical medium which supports generation of signal and idler wavelengths, and optionally a further non-linear optical medium which supports generation the second-harmonic of the signal or idler wavelength.

The second resonant cavity can have arranged therein a non-linear optical medium, pumped by the resonated optical radiation, which supports generation of Raman-shifted optical radiation.

The second resonant cavity can have arranged therein a second non-linear optical medium which supports generation of the second harmonic of the Raman-shifted optical radiation.

The second resonant cavity can have arranged therein a second non-linear optical medium which supports generation of the sum-frequency (or difference-frequency) of the resonated optical radiation and Raman-shifted radiation.

The second resonant cavity can have arranged therein a solid-state laser medium within a third resonant cavity, pumped by the optical radiation resonated in the second resonant cavity, which supports generation of laser radiation from the solid-state laser medium. The third resonant cavity optionally has arranged therein a non-linear optical medium for solid-state laser medium pumped by the optical radiation resonated in the second resonant cavity, which supports generation of the second harmonic of the laser radiation resonated in the third resonant cavity.

The second resonant cavity can have arranged therein a solid-state laser medium, pumped by the optical radiation resonated in the second resonant cavity, which supports generation of laser radiation from the solid-state laser medium.

The second resonant cavity can have arranged therein a solid-state laser medium pumped by an external laser source and a nonlinear optical medium which supports generation of the sum-frequency (or difference-frequency) of the resonated optical radiation and solid-state laser radiation.

In another design variation, the first resonant cavity includes a plurality, e.g. 2, 3 or 4, amplifying fibers arranged in series with optical feedback provided, e.g. by reflectors, to generate optical radiation at different wavelengths at least one of which is resonant in a common second resonant cavity.

In a further design variation, the first resonant cavity includes a plurality of arms, e.g. 2 or 3, each arm having one or more amplifying fibers with optical feedback, e.g. by reflectors, to generate optical radiation at different wavelengths, said optical radiation at least one of these different wavelengths being resonant in a common second resonant cavity.

An important design aspect for efficient optical pumping of laser materials with low absorption and for nonlinear frequency conversion is based on impedance matching. Namely, the second resonant cavity has arranged therein a laser medium having the property of absorbing light in the frequency band of the first resonant cavity, wherein, for light in the frequency band of the first resonant cavity, the round trip loss in the second resonant cavity—including absorption by the laser medium—is matched to the proportion of light coupled into the second resonant cavity.

This approach is particularly attractive since it can provide efficient optical pumping for laser materials that have low absorption in the frequency band of the first resonant cavity, e.g. only 1-10% or lower. The arrangement of the laser medium in the second resonant cavity may provide for single pass, double pass or multi-pass of the light through the laser medium. Losses other than losses caused by absorption in the laser medium are to be kept low, preferably so that they are small, or negligible, compared with the laser medium absorption losses. If this is the case, then most, or substantially all, of the optical power that enters the second resonant cavity will be absorbed in the laser medium.

In many embodiments, each transmission band of the second resonant cavity has a width greater than the separation between the standing wave modes of the first resonant cavity. However, this condition will not be fulfilled in all embodiments, since in some embodiments there may be on average fewer modes capable of lasing than the number of transmission bands of the second resonant cavity within the frequency band of the first resonant cavity. In some embodiments, each transmission band of the second resonant cavity has a full width half maximum equal to at least x times the separation between adjacent standing wave modes of the first resonant cavity, where $x \geq 1$. For example, $10 \geq x \geq 1$. In other embodiments, each transmission band of the second resonant cavity has a full width half maximum equal to at least x times the separation between adjacent standing wave modes of the first resonant cavity, where x≥1. For example, 1≥x≥0.1.

The optical fiber gain medium may be based on an optical fiber doped with active laser ions, thereby to provide the amplifying medium. Alternatively, the gain may be Raman gain derived from the glass of the optical fiber, principally the core. Namely, as is well known, the inter-atomic bonds between constituent elements of the glass support vibrational modes, and one or more of these modes can be selected in the overall design of the device to be pumped to derive Raman gain, thereby to provide the amplifying medium. Specifically, the device is designed such that there is a vibrational mode with a Stokes energy that bridges the energy difference between the pump frequency band and the first frequency band, so that stimulated Raman scattering generates gain in the first frequency band. To effect this, a further pump source, such as a fiber laser, is provided to act as a pump for the optical fiber gain medium.

Embodiments of the invention are particularly suited to continuous wave operation in which case the pump is driven so that the lasing is continuous wave. Pulsed operation is also possible.

The overall design concept combines the advantages of fiber lasers for high-power continuous-wave generation with a simple internal resonant cavity for enhancing the power to a level that is many times the continuous-wave power that can be generated from the fiber laser alone.

The internal enhancement cavity can be configured with an appropriate nonlinear crystal to allow efficient nonlinear frequency conversion of the fiber laser's output at the fundamental operating wavelength via frequency doubling to output at half the fundamental wavelength (which may be in the visible wavelength regime). Alternatively, the internal enhancement cavity can be configured as an optical parametric oscillator (singly-resonant or doubly-resonant), using an appropriate nonlinear crystal, to allow efficient nonlinear frequency conversion of the fiber laser's output at the fundamental operating wavelength to output at longer wavelengths.

The fiber laser may be configured as two or more fiber lasers with different operating wavelengths, selected by appropriate means (e.g. fiber Bragg gratings (FBGs)) to lie within the phase matching bandwidth for the nonlinear process in use (e.g. second-harmonic generation, optical parametric generation) and then wavelength-combined into a single beam using, for example, volume Bragg gratings, and sharing a common feedback cavity containing an internal enhancement cavity configured with a suitable nonlinear crystal for the desired nonlinear frequency conversion process to allow further power scaling.

Optical fiber-based laser sources can be provided with internal (intracavity) enhancement cavities for the purpose of increasing the intracavity power to facilitate efficient nonlinear frequency conversion to other wavelength regimes, or to enhance absorption of the fiber laser radiation in weakly absorbing laser media and other materials to achieve efficient optical pumping for a range of applications.

The fiber laser may be configured as two fiber lasers with different operating wavelengths, selected by appropriate means (e.g. fiber Bragg gratings (FBGs)) and wavelength-combined into a single beam using, for example, volume Bragg gratings and sharing a common feedback cavity containing an internal enhancement cavity configured with a suitable nonlinear crystal for sum frequency generation to generate shorter wavelength output or difference frequency generation to generate longer wavelength output. The flexibility in operating wavelength of fiber lasers combined with flexibility in the nonlinear frequency conversion process allows access to high power laser output in wavelength regimes in the UV, visible and mid-infrared that cannot be obtained directly from fiber lasers and solid-state lasers.

The internal enhancement cavity can also be configured to allow efficient optical pumping of a weakly absorbing laser medium in a thin disk, rod or slab laser configuration at high pump power. For the latter, the fiber laser can be configured as one or more fiber lasers with different operating wavelengths, selected by appropriate means (e.g. fiber Bragg gratings (FBGs)), to lie within the absorption line bandwidth and wavelength-combined into a single beam using, for example, volume Bragg gratings and sharing a common feedback cavity containing an internal enhancement cavity configured with the laser medium in a thin disk, rod or slab laser resonator configuration for further power scaling. Alternatively, the fiber laser can be configured as two or more fiber lasers with different operating wavelengths, selected by appropriate means (e.g. fiber Bragg gratings (FBGs)) to coincide with different absorption lines and wavelength-combined into a single beam using, for example, volume Bragg gratings and sharing a common feedback cavity containing an internal enhancement cavity configured with the laser medium in a thin disk, rod or slab laser resonator configuration. Regardless of the fiber laser configuration, pump light at an appropriate wavelength may also be supplied to the solid-state laser material directly (i.e. without resonant enhancement) from another laser source (e.g. diode laser). In this way, higher lying energy levels can be populated in a two or more step process to yield laser emission at much shorter wavelengths in the visible region of the spectrum.

A fiber laser configuration can be provided which comprises at least one active-ion doped fiber in a resonator containing an internal resonant enhancement cavity configured to increase the intracavity power within the enhancement cavity to many times the continuous-wave power that can be generated by the fiber laser alone for the purpose of efficient nonlinear frequency conversion to other wavelength regimes or efficient optical pumping of weakly absorbing solid-state laser materials. Some embodiments use a standing-wave resonator configuration. Other embodiments use a ring resonator configuration.

The fiber laser can operate on axial modes defined by the effective length of the fiber laser resonator. The axial modes are usually quite closely spaced in a fiber laser, compared to other types of laser, due to the relatively long length of fiber that is typically used. The axial modes which are also resonant in the internal enhancement cavity are fed back to the fiber gain medium with the lowest loss, hence the fiber laser operates preferentially on these axial modes. The axial modes that are not resonant in the enhancement cavity experience a much higher round-trip cavity loss and hence do not lase. For applications, such as nonlinear frequency conversion, where further control of the emission spectrum is needed, the fiber laser is also equipped with a component to select the overall operating wavelength and overall linewidth. This may be, for example, a fiber Bragg grating, a volume Bragg grating (VBG), diffraction grating or an acousto-optic tunable filter (AOTF).

The design relies on there being two or more standing wave modes, typically axial modes, that are resonant in the internal enhancement cavity at any one time. This condition is easy to satisfy in a fiber laser due to the long resonant cavity length. Thus, there is no need to actively control and stabilize the overall fiber laser length, i.e. resonator length, or the internal enhancement cavity length, since the device automatically lases on axial modes that are resonant in the enhancement cavity. (This is in contrast to the situation for an external resonant enhancement cavity.) The design can be realized such that there are many axial modes which simultaneously satisfy the condition which results in highly stable output power (i.e. power converted to other wavelengths via nonlinear frequency conversion or via optical pumping of a solid-state laser). This behavior follows from the fiber-based implementation of the resonant (intracavity power) enhancement scheme (due to the long fiber length), in contrast to the situation described in references [7] and [8], where an internal enhancement resonator has been used for locking the output frequency of a low-power, single-frequency diode laser for internal second harmonic generation to generate visible light at low powers.

A further important feature is that the enhancement cavity can provide an effective temporal filter (due to its round-trip time and hence finite build-up time). Hence, self-pulsing (a serious problem in some fiber laser systems) is effectively suppressed. Suppression of self-pulsing can be further assisted when the internal enhancement cavity is configured for nonlinear frequency conversion, since the nonlinear loss acts to damp pulsing behavior.

In some embodiments, the output beam from the fiber gain stage is spatially-matched (e.g. using an arrangement of lenses) to the fundamental transverse (TEM$_{00}$) mode of the internal enhancement cavity to reduce loss and maximize efficiency. The fiber gain stage has a core with refractive index, $n_1$, which is larger than the refractive index, $n_2$, of the surrounding cladding material, as required for guiding of light within the core region.

The active ion used in the gain medium, typically the core of the fiber, can be bismuth or a rare earth element or a combination of rare earth elements. Suitable rare earth ions include ytterbium, neodymium, erbium, thulium, praseodymium, samarium and holmium, as well as combinations thereof, to provide gain at various wavelengths and to facilitate efficient absorption of pump light from one or more pump lasers. Alternatively, in some embodiments, the fiber gain medium may be based on Raman scattering and thus be based on the vibrational modes associated with one or more of the principal bonds between the main elemental glasses of the fiber core (e.g. Si, C, B, O, Na in a silicate or borosilicate fiber).

The diameter and numerical aperture (NA) of the core can be specified so that the core supports only a single-spatial-mode or, alternatively, the core size and NA can be specified so that the core supports multiple spatial modes. In the latter case, further measures (e.g. mode filtering by bending the fiber [9]) may be required to suppress higher order modes, so that only the fundamental spatial mode lases or to ensure selective excitation of the fundamental mode [10].

Alternatively, the fiber laser may lase with a plurality of transverse modes inside the fiber's core which, on exiting the fiber end adjacent to the internal enhancement cavity, have relative phases and powers such that they interfere to yield a combined (resultant) beam that can be substantially spatially-matched to the fundamental transverse (TEM$_{00}$) mode of the internal enhancement cavity by using an appropriate arrangement of lenses. The underlying physical principles for this approach can be explained as follows: In a multi-mode fiber core, the number of allowed transverse modes depends on the refractive index of the core ($n_1$), the refractive index of the surrounding cladding material ($n_2$) and the core diameter, where $n_1 > n_2$ for guidance. Each transverse mode is characterized by an effective propagation constant and related effective refractive index ($n_{eff}$), where $n_1 > n_{eff} > n_2$. The exact value for $n_{eff}$ for a particular mode depends on the details of the fiber design and the mode, but as a rough guide low order modes have a smaller mode size than higher order modes and hence have a higher value for $n_{eff}$. Each allowed transverse mode of the fiber has a range of allowed frequencies, $v_q = qc/L_{eff}$, where q is an integer, c is the velocity of light and $L_{eff}$ is the effective round-trip length of the first resonant cavity. These allowed frequencies define the axial modes associated with a particular transverse mode. The effective length, $L_{eff}$ depends, amongst other things, on the length of the optical fiber and the effective refractive index, $n_{eff}$ of a particular transverse mode. Since the values for $n_{eff}$ are, in general, different for different from transverse modes, the associated axial mode frequencies are also different. However, at certain frequencies the axial modes of two or more transverse modes share the same frequency and there is a well-defined phase relationship between these modes. The internal enhancement cavity acts as a spatial filter and a frequency filter, since only the transverse modes of the fiber core which interfere to yield a combined beam that is substantially spatially-matched to the fundamental mode of the enhancement cavity and with axial mode frequencies that are resonant in the internal enhancement cavity are fed back to the fiber gain element and hence can lase. Other transverse modes with different axial mode frequencies experience a high reflection loss at the input mirror to the enhancement cavity and hence are suppressed. Preferential lasing on the fundamental (TEM$_{oo}$) mode of the enhancement cavity may be aided by the use of one or more apertures in the enhancement cavity to help suppress higher order transverse modes.

The ability of the design to accommodate the use of a gain medium with a larger core area than the limit for single mode behavior is an important advantage. Using a larger core increases the catastrophic facet damage threshold and the threshold for unwanted nonlinear loss processes and thus facilitates further power scaling.

For applications requiring a linearly-polarized beam (e.g. nonlinear frequency conversion) the fiber is preferably a polarization-maintaining (PM) fiber. The fiber cladding is surrounded by an outer-cladding (or coating) of refractive index, $n_3$, which may be higher than the refractive index ($n_2$) of the inner-cladding, or may be lower than $n_2$ to allow pump light to be guided in the inner-cladding as required for cladding-pumped fiber configurations.

It will be appreciated that a suitable pump—typically a laser—is needed for exciting the active ions. Suitable pump lasers include, for example, a diode laser, a fiber laser source, a solid-state laser, or a combination of more than one pump laser of the same or different types. The pump laser can be configured as a laser oscillator or a master-oscillator power-amplifier (MOPA) or a combination of more than one pump laser of the same or different types.

Pump light from the pump is coupled into the fiber gain medium. This may be achieved by coupling through one or both end facets of a standing-wave resonator. Another option is to couple through the side of the fiber which is possible also in a ring resonator.

For efficient operation, it is beneficial to impedance match the intracavity laser beam (i.e. from the fiber gain stage) incident on the internal enhancement cavity. This can be achieved by making the transmission of the input mirror of the enhancement cavity approximately equal to the round-trip loss of the enhancement cavity (excluding the transmission of the input mirror) to maximize the laser power from the fiber that enters the enhancement cavity. This loss includes the loss due to nonlinear frequency conversion and/or absorption.

Embodiments can provide a fiber laser source comprising at least one fiber gain stage, which may be active ion based or Raman based, with feedback for lasing and at least one internal resonant enhancement cavity configured so that the fiber laser automatically operates on multiple axial modes which are simultaneously resonant in the enhancement cavity and which couple into the enhancement cavity with high efficiency leading to intracavity powers in the enhancement cavity that are many times the maximum continuous-wave powers that can be generated by the fiber gain stage(s) alone.

Embodiments can also provide a device for efficient generation of coherent emission at other wavelengths via nonlinear frequency conversion (e.g. second harmonic generation, sum-frequency generation, difference frequency generation and optical parametric generation) by inserting an appropriate nonlinear crystal into the enhancement cavity and configuring the enhancement cavity, fiber laser resonator and operating wavelength for the desired nonlinear frequency conversion process.

It is thus possible to design devices to deliver high continuous-wave powers at wavelengths in the UV, visible and infrared, not directly available from fiber lasers, without the need for complicated single-frequency master-oscillator fiber power-amplifier systems with external resonant cavities that require accurate length control and stabilization.

It is thus also possible to design devices for generating coherent emission at other wavelengths via optical pumping of weakly absorbing solid-state laser media in disk, rod or slab-based laser resonators by inserting an appropriate laser crystal into the enhancement cavity and configuring the enhancement cavity, fiber laser resonator and operating wavelength for the desired pumping scheme.

Some embodiments employ a fiber laser configuration with an internal resonant enhancement cavity capable of yielding high intracavity power inside the enhancement cavity for efficient nonlinear frequency conversion and efficient optical pumping of weakly absorbing laser media and other materials.

It is thus further possible to design devices to deliver high continuous-wave powers on solid-state laser transitions that are otherwise difficult to operate via conventional pumping schemes, thereby providing access to an extended range of operating wavelengths at high power levels.

BRIEF DESCRIPTION OF THE DRAWINGS

The invention is now described by way of example only with reference to the following drawings.

DETAILED DESCRIPTION

Figure 1:
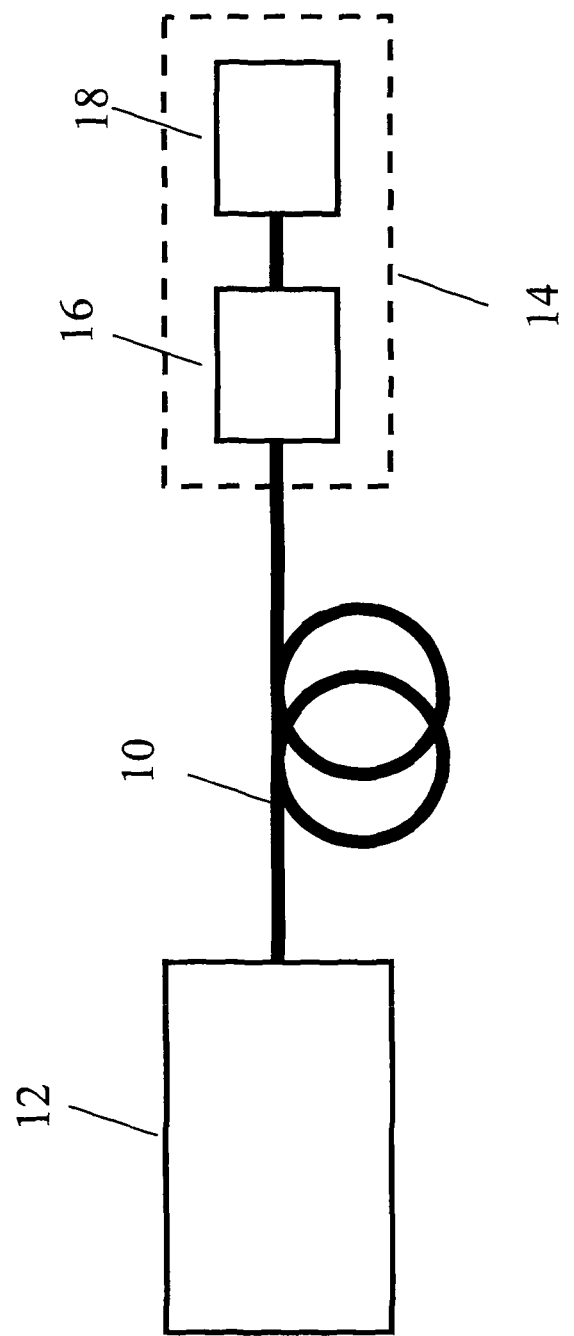
FIG. 1 shows the basic structure of a fiber laser device according to one group of embodiments based on a standing-wave cavity configuration.

FIG. 1 is a schematic block diagram of an optical fiber laser device according to a first embodiment which is based on a linear or standing-wave resonator configuration. A portion of optical fiber 10 is provided having a core and a cladding. The core is doped with suitable rare earth ions or bismuth to provide gain. A standing-wave resonator cavity is formed around the fiber 10 by first and second reflectors 12 and 18. The first reflector 12 is wavelength selective. The second reflector 18 is a mirror. The mirror 18 is part of an external feedback cavity 14 also comprising a resonant enhancement cavity 16 arranged within the resonator cavity formed by the first and second reflectors 12 and 18.

The fiber laser source can operate on axial modes defined by the effective length of whole cavity 12, 18 that lie within the emission spectrum of the active ions and the range of operating wavelengths defined by the wavelength-selective reflector 12. The cavity length will also include a contribution from the resonant enhancement cavity 16, but typically this effect will be a small perturbation, since typically the length of the fiber will be very much greater than the cavity dimensions of the resonant enhancement cavity 18. The reflector 12 can be, for example, a fiber Bragg grating (FBG) or an external cavity arrangement containing a wavelength selective element (e.g. diffraction grating, volume Bragg grating, birefringent filter, acousto-optic tunable filter). The resonant enhancement cavity (when configured in the appropriate manner) imposes a further constraint on the axial modes that can lase, since only those that are also resonant in the enhancement cavity 16 have sufficient feedback to reach threshold. Non-resonant axial modes have a much higher loss and therefore cannot lase.

For stable lasing output, it is necessary that there are at least two modes, typically axial modes, of the resonator cavity 12, 18 that are also resonant in the internal enhancement cavity 16. In practice, for stable operation it is desirable that the number of cavity modes is more than two, for example at least 3, 4, 5, 6, 7, 8, 9, 10, 11, 12, 13, 14 or 15. The number of cavity modes may be much greater, for example of the order of $10^2$, $10^3$, $10^4$ or $10^5$. The desired number or range of numbers of axial modes that are also resonant with the enhancement cavity is readily satisfied for a given enhancement cavity design by using a relatively long fiber length to achieve a sufficiently small axial mode spacing.

The fiber 10 which is active ion doped may be spliced to a length of passive fiber if desired. The core size and numerical aperture (NA) for the active fiber are preferably matched the core size and NA of the passive fiber to minimize splice loss. The maximum fiber length that can be used is determined by the onset of unwanted nonlinear loss processes (i.e. stimulated Brillouin scattering (SBS) and stimulated Raman scattering (SRS)) and by fiber propagation loss, which act to reduce lasing efficiency. As an aside, we note that embodiments described further below are based on Raman scattering, so the reference here to SRS being unwanted is specific to the active ion based embodiments.

The ability to operate on multiple axial modes that are simultaneously resonant in the internal enhancement cavity is significant, because a long fiber length and hence cavity length can be employed in a practical and compact format by coiling the fiber. As a consequence, there is no need to actively control and stabilize the overall fiber laser length and internal enhancement cavity length, since the fiber laser automatically lases on axial modes that are resonant in the enhancement cavity, regardless of perturbations in effective length due to temperature fluctuations, vibrations, etc. This is in contrast to prior art techniques based on the use of an external resonant enhancement cavity.

The laser source may be configured such that the output beam from the gain fiber 10 is spatially-matched (e.g. using an arrangement of lenses) to the fundamental transverse ($TEM_{00}$) mode of the internal enhancement cavity 16 to reduce loss and maximize efficiency. The fiber 10 has a core with refractive index, $n_1$, which is larger than the refractive index, $n_2$, of the surrounding cladding material, as required for guiding of light within the core region. The core of the fiber gain element is doped with an active laser ion (e.g. ytterbium, neodymium, erbium, thulium, praseodymium, samarium, holmium, or bismuth) or a combination of active laser ions to provide gain at various wavelengths and to facilitate efficient absorption of pump light from one or more pump lasers.

The diameter and numerical aperture (NA) of the core can be specified so that the core supports only a single-spatial-mode, i.e. is a single mode fiber. However, the mode selection caused by the combination of cavity 12, 18 and internal cavity 16 also allows multi-mode fiber to be used. That is to say, the core size and NA can be specified so that the core supports multiple spatial modes.

When using multi-mode fiber, it may be desirable to use additional measures to suppress higher order modes, so that only the fundamental spatial mode lases or to ensure selective excitation of the fundamental mode [10]. One technique is to mode filter by bending the fiber [9]. Alternatively, the fiber laser may be configured so that a collection of transverse modes lase with relative phases on exiting the fiber 10 such that the constituent beams interfere to yield a combined (resultant) beam that can be spatially-matched to the fundamental transverse ($TEM_{00}$ mode of the internal enhancement cavity 16. The use of a larger core area than the limit for single mode operation increases the catastrophic facet damage threshold and the threshold for unwanted nonlinear loss processes, and thus facilitates further power scaling.

For applications requiring a linearly-polarized beam (e.g. nonlinear frequency conversion) the fiber can be polarization-maintaining (PM) fiber.

The fiber cladding is surrounded by an outer-cladding (or coating) of refractive index, $n_3$, which may be higher than the refractive index ($n_2$) of the inner-cladding, or may be lower than $n_2$ to allow pump light to be guided in the inner-cladding as required for cladding-pumped fiber configurations.

A pump laser (not shown) is arranged to excite the active ions in the core of the fiber 10. The pump laser may, for example, be a diode laser, a fiber laser source, a solid-state laser, or a combination of more than one pump laser of the same or different types. Light is coupled from the pump or pumps into the active fiber 10 through one or both end facets and/or through the side of the fiber.

It can be advantageous that the intracavity laser beam output from the fiber 10 incident on the internal enhancement cavity 16 is impedance matched by making the transmission of an input mirror of the enhancement cavity approximately equal to the round-trip loss of the enhancement cavity (excluding the transmission of the input mirror). The impedance matching serves to maximize the laser power from the fiber 10 that enters the enhancement cavity 16 and hence the intracavity power.

Figure 2:
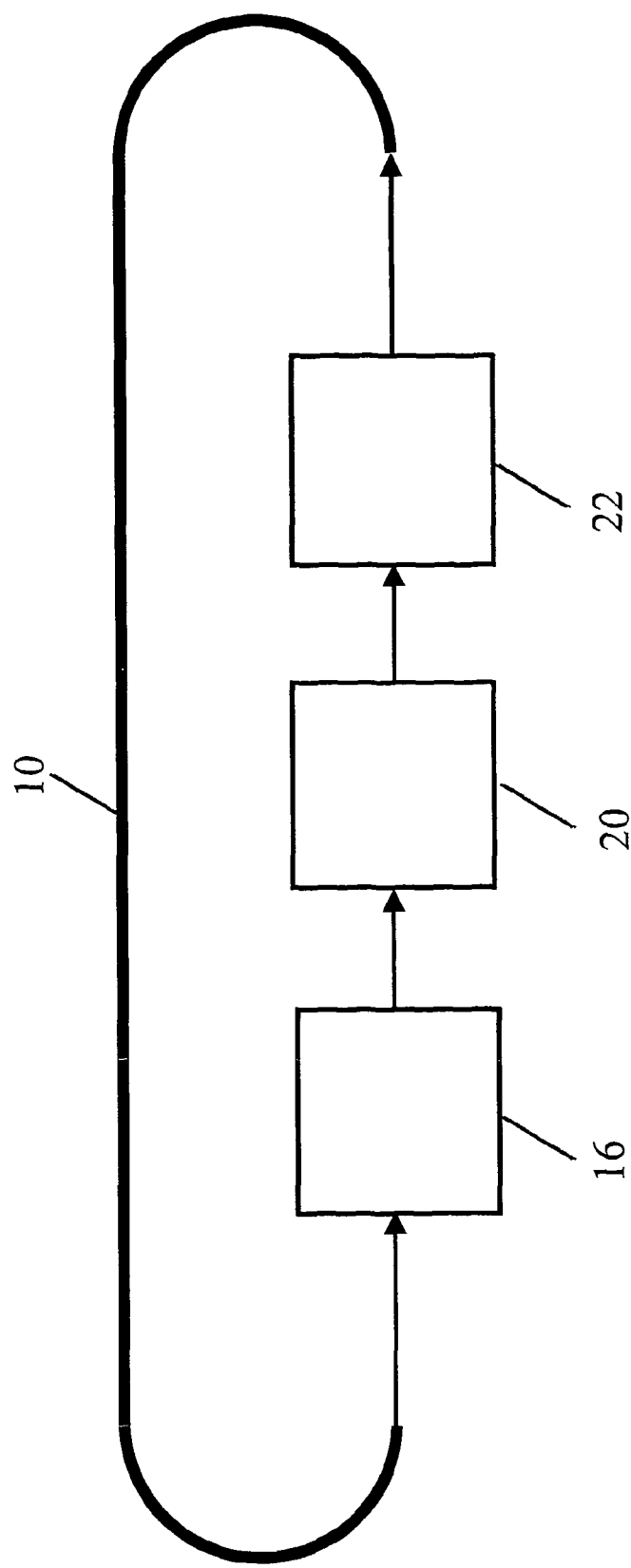
FIG. 2 shows the basic structure of a fiber laser device according to another group of embodiments based on a ring cavity configuration.

FIG. 2 is a schematic block diagram of an optical fiber laser device according to a second embodiment which is based on a ring resonator configuration. The device comprises an optical fiber gain stage 10 similar to that of the first embodiment and a resonant enhancement cavity 16 also similar to that of the first embodiment. By comparison with the first embodiment, a wavelength-selective filter 20 is provided in place of the wavelength-selective reflector 12. Moreover, the ring resonator includes a unidirectional device 22 to force uniaxial lasing in the ring. To effect this function, the unidirectional device 22 has a higher transmission loss in the clockwise propagation direction than in the counter-clockwise propagation direction to enforce unidirectional lasing in the counter-clockwise direction. The unidirectional device 22 employs an arrangement of polarizers, wave plates (and/or optical rotators) and a Faraday rotator to yield different transmission for counter-propagating beams.

The wavelength-selective filter 20 provides wavelength dependent transmission (or feedback), as required to select the fiber laser's operating wavelength and emission bandwidth. The wavelength-selective filter 20 can be realized with a variety of wavelength discriminating components such as FBG, diffraction grating, volume Bragg grating, birefringent filter, or acousto-optic tunable filter. As in the first embodiment, the role of the wavelength-selective element is to achieve the desired control over the fiber laser's operating wavelength.

The principle of operation of the device of the second embodiment is essentially the same as for the first embodiment. The second embodiment has the advantage over the first embodiment that the laser beam propagates through each element of the ring resonator in one direction only allowing a reduction in overall resonator loss. However, this advantage comes with the disadvantage of the added complexity associated with the addition of the unidirectional device 22.

Coupling of the laser beam between the optical fiber gain stage 10, resonant enhancement cavity 16, wavelength-selective filter 20 and unidirectional device 22 can be achieved using an arrangement of lenses (not shown). The ordering of the various components in the ring resonator with respect to the propagation direction can be varied. For example, the positions of the wavelength-selective filter 20 and unidirectional device 22 can be interchanged. However, the resonant enhancement cavity 16 is preferably located immediately after the fiber gain stage 10, so that laser light that exits the fiber is first incident on the resonant enhancement cavity to maximize the power coupled into the resonant enhancement cavity and hence its intracavity power.

Figure 3:
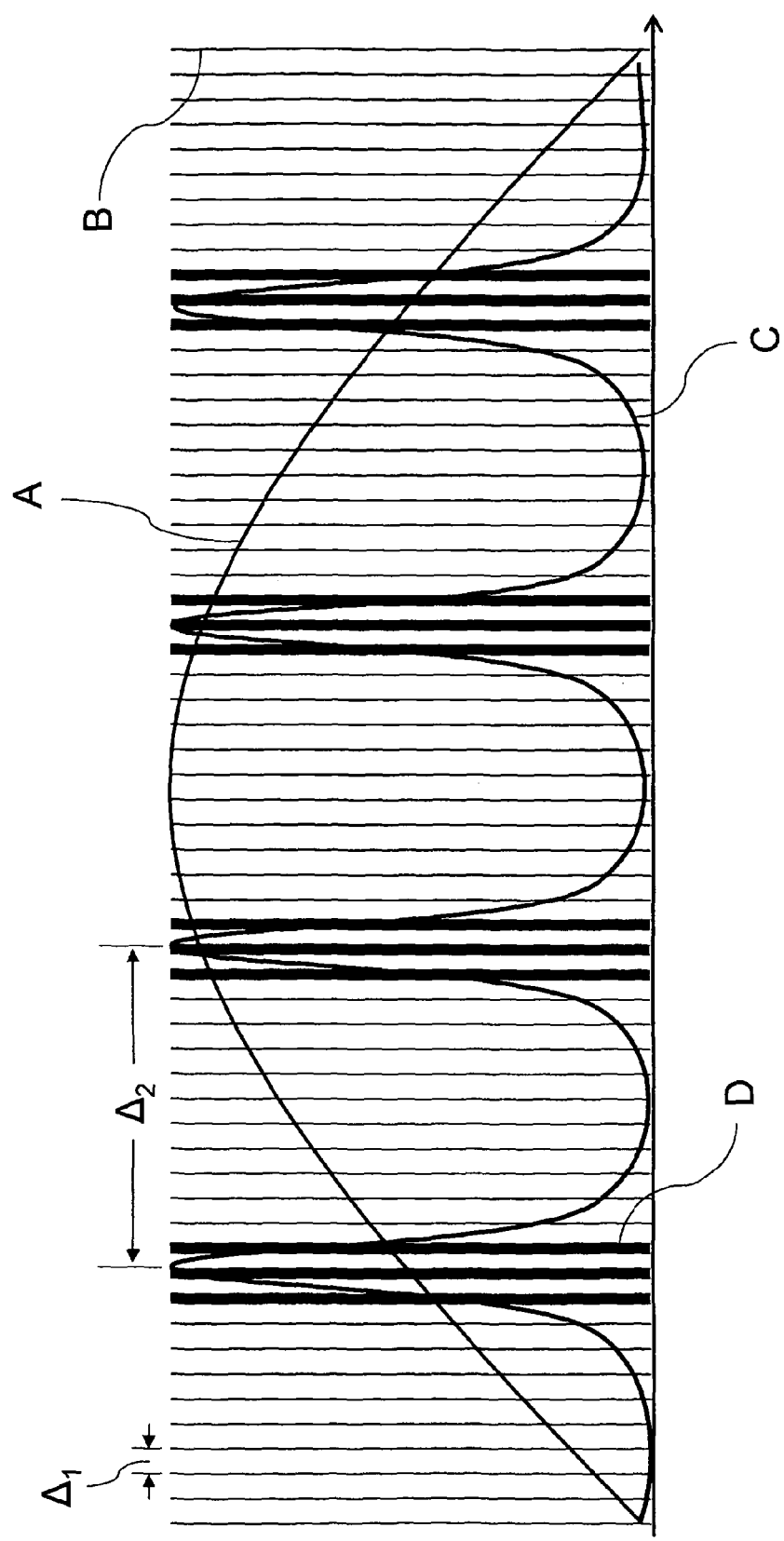
FIG. 3 is a schematic graph in the spectral domain showing the fundamental design principles of embodiments of the invention.

FIG. 3 is a schematic graph in the spectral domain showing the fundamental design principles of the invention.

The first resonant cavity defined by the effective optical path length between the end reflectors in a standing wave configuration, or by the effective round-trip optical path length in a ring configuration, forms a resonator. The frequency band of the first resonant cavity is limited by suitable design features of the cavity. In the drawing, this frequency band is the broad curve labeled 'A' with a single peak. There are many ways to limit the frequency band in practice. For example, in standing-wave configurations, one of the cavity end reflectors may have wavelength selective reflection, e.g. it may be a grating. For ring configurations (and also in principle for standing wave configurations), the frequency band can be defined by the transmission properties of a wavelength-selective filter 20. The frequency band 'A' of the first resonant cavity is designed to be sufficiently broad to include a relatively large number of standing wave modes of the first resonant cavity—typically axial modes derived from the fundamental transverse mode. The frequencies of these standing wave resonator modes are illustrated in the graph by the fine vertical solid lines labeled 'B' of spacing $\Delta_1$.

The second resonant enhancement cavity 16 which is arranged in the first resonant cavity has a transmission response labeled 'C' that includes a plurality of transmission bands within the frequency band of the first resonant cavity. The transmission response of the second resonant enhancement cavity 16 is illustrated by curve 'C' with four transmission peaks of spacing $\Delta_2$. In a typical implementation any number of transmission bands may be present. The number could be very small as in the illustration, but may be much larger numbers of the order of $10^2$, $10^3$, $10^4$ or $10^5$.

Each transmission band of the second resonant cavity is illustrated as having a width greater than the separation between the standing wave modes of the first resonant cavity, so that there are a plurality of standing wave modes which lie within both the frequency band of the first resonant cavity and at least two of the transmission bands of the second resonant cavity. This condition need not be satisfied in all embodiments, for example there may be on average less than one standing wave mode in each transmission band. The standing wave modes coincident with the transmission bands that lie in the overall frequency band of the first resonant cavity are the ones that are in principle capable of lasing, although they may not all lase when the device is in use, since they will compete against each other. These lasing 'candidate' modes are drawn with thicker vertical lines and labeled 'D'. In the drawing, there are 12 of these modes.

It will be appreciated that the functional form of the responses shown in the drawing are non-limiting, for example the frequency band of the first (external) resonant cavity may follow a step function, and the transmission bands of the second (internal) enhancement cavity 16 may have different functional forms.

Using these principles, it is possible to provide a fiber laser source comprising at least one fiber gain stage with feedback for lasing and at least one internal resonant enhancement cavity configured so that the fiber laser automatically operates on multiple axial modes which are simultaneously resonant in the enhancement cavity. These axial modes can be coupled into the enhancement cavity with high efficiency leading to intracavity power in the enhancement cavity that is many times the maximum continuous-wave power that can be generated by the fiber gain stage(s) alone.

Different embodiments can provide for efficient generation of coherent emission at other wavelengths via nonlinear frequency conversion (e.g. second harmonic generation, sum-frequency generation, difference frequency generation and optical parametric generation) by inserting an appropriate nonlinear crystal into the enhancement cavity and configuring the enhancement cavity, fiber laser resonator and operating wavelength for desired nonlinear frequency conversion process.

Further embodiments can deliver high continuous-wave powers at wavelengths in the UV, visible and infrared, that hitherto have not been directly available from fiber lasers without the need for complicated single-frequency master-oscillator fiber power-amplifier systems with external resonant cavities that require accurate length control and stabilization.

Still further embodiments can provide for efficient generation of coherent emission at other wavelengths via efficient optical pumping of weakly absorbing solid-state laser media in disk, rod or slab-based laser resonators by inserting an appropriate laser crystal into the enhancement cavity and configuring the enhancement cavity, fiber laser resonator and operating wavelength for the desired pumping scheme.

Yet further embodiments can provide high continuous-wave powers on solid-state laser transitions that are otherwise difficult to operate via conventional pumping schemes thereby providing access to an extended range of operating wavelengths at high power levels.

Figure 4:
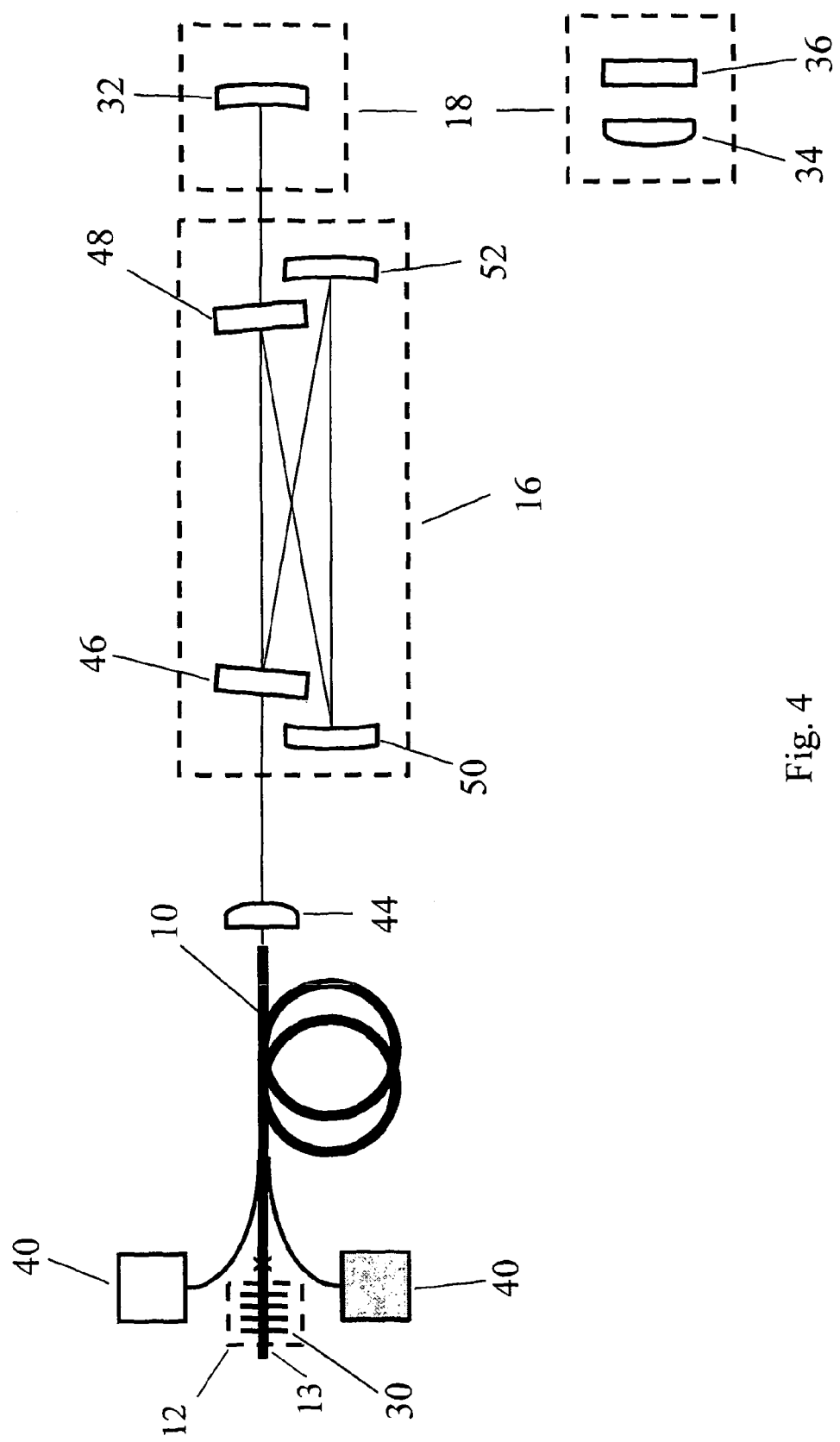
FIG. 4 shows a first embodiment with a standing-wave cavity configuration.

FIG. 4 shows the main components already described with reference to FIG. 1, namely a portion of optical fiber 10, a standing-wave resonator cavity formed around the fiber 10 by first and second reflectors 12 and 18, and an internal resonant enhancement cavity 16. As in the first embodiment, an external feedback cavity is made by the resonant enhancement cavity 16 and the reflector 18. The internal enhancement cavity 16 is configured as a ring resonator and comprises first and second plane mirrors 46 and 48, and two curved mirrors 50 and 52.

The fiber 10 is an active-ion doped double-clad fiber. The end of the active fiber 10 facing the resonant enhancement cavity 16 is preferably terminated in a suitable way (e.g. by cleaving, polishing, using an antireflection coating or splicing to an end-cap) to reduce broadband feedback from the fiber end facet that might otherwise compete with feedback provided by the external cavity, thereby to prevent parasitic lasing between the FBG and fiber end facet. The output from the end of the fiber 10 adjacent to the enhancement cavity 16 is best collimated and conditioned with one or more lenses 44, so that the beam is spatially-matched the fundamental (TEM$_{00}$) mode of the enhancement cavity 16 to maximize the laser power coupled into the enhancement cavity.

The first reflector 12 is a fiber Bragg grating 30 formed from a portion of passive fiber 13 spliced to the gain fiber 10 with the splice being indicated by a cross in the figure. Alternatively, the fiber Bragg grating 30 may be written directly in the active fiber 10. The design of the FBG can be tailored to provide the desired wavelength dependent feedback to suit the application.

The reflector 18 is illustrated in the main drawing as being a concave mirror 32 with a high reflectivity dielectric coating. The radius of curvature of the concave mirror 32 is best matched to the radius of curvature of the wavefronts of the incident laser beam, so that the reflected beam is spatially-mode-matched to the fundamental (TEM$_{00}$) mode of the enhancement cavity 16. Alternatively, the same function may be performed by an arrangement of lenses (e.g. 34) and a high reflectivity mirror 36, as illustrated in the "alternative" dashed box shown below the main drawing.

Pump lasers 40 are connected by respective fibers to the gain fiber 10 via suitable couplers. Two pump lasers 40 are illustrated, but it will be appreciated that the number of pump lasers can be chosen as desired, and may be 1, 2, 3, 4 or more. The pump coupler may be configured to allow coupling of the pump light through the side or end of the gain fiber 10 to excite the active ions in the core. The pump lasers 40 can be one of more diode lasers, fiber lasers or solid-state lasers at appropriate wavelengths for exciting the active ions in the doped fiber, or may be a combination of these pump sources. Alternatively, if the active fiber is a single-mode (single-clad) fiber, a wavelength division multiplexing (WDM) coupler may be used to couple the pump light from a single mode laser source.

The fiber laser automatically operates on axial modes (within the wavelength band defined by the FBG) that are resonant in the enhancement cavity, since all other axial modes have a much higher loss and are therefore suppressed. Preferential lasing on the fundamental (TEM$_{oo}$) transverse mode of the enhancement cavity may be aided by the use of one or more apertures in the enhancement cavity to help suppress higher order transverse modes.

Laser radiation which is coupled into the enhancement cavity 16 via mirror 46 is resonated and a small fraction of this power is transmitted through mirror 48 and is fed back by reflector 18, via the enhancement cavity, to the active fiber. The overall feedback efficiency to the active fiber depends, amongst other things, on the reflectivities of mirrors 46, 48, 50 and 52, so these must be selected to yield high intracavity power in the enhancement cavity whilst at the same time allowing sufficient feedback to the active fiber to ensure efficient lasing. Typically mirror 48 has a low transmission of ~0.5-2% at the lasing wavelength, mirrors 50 and 52 have very high reflectivity (>99.8%) and the transmission of mirror 46 is selected to be approximately equal to the round-trip loss of the enhancement cavity (i.e. excluding the transmission of mirror 46) to satisfy the condition for impedance matching to ensure a large fraction of the laser power from the active fiber incident on mirror 46 is coupled into the enhancement cavity. Laser radiation may be coupled out of the enhancement cavity by making one of the mirrors 50 or 52 partially transmitting (whilst maintaining impedance matching) to provide a useful output beam or may be converted (e.g. via nonlinear frequency conversion in a nonlinear crystal placed in the enhancement cavity or via optical pumping of another laser material placed in the enhancement cavity) to useful laser radiation at another wavelength.

Figure 5:
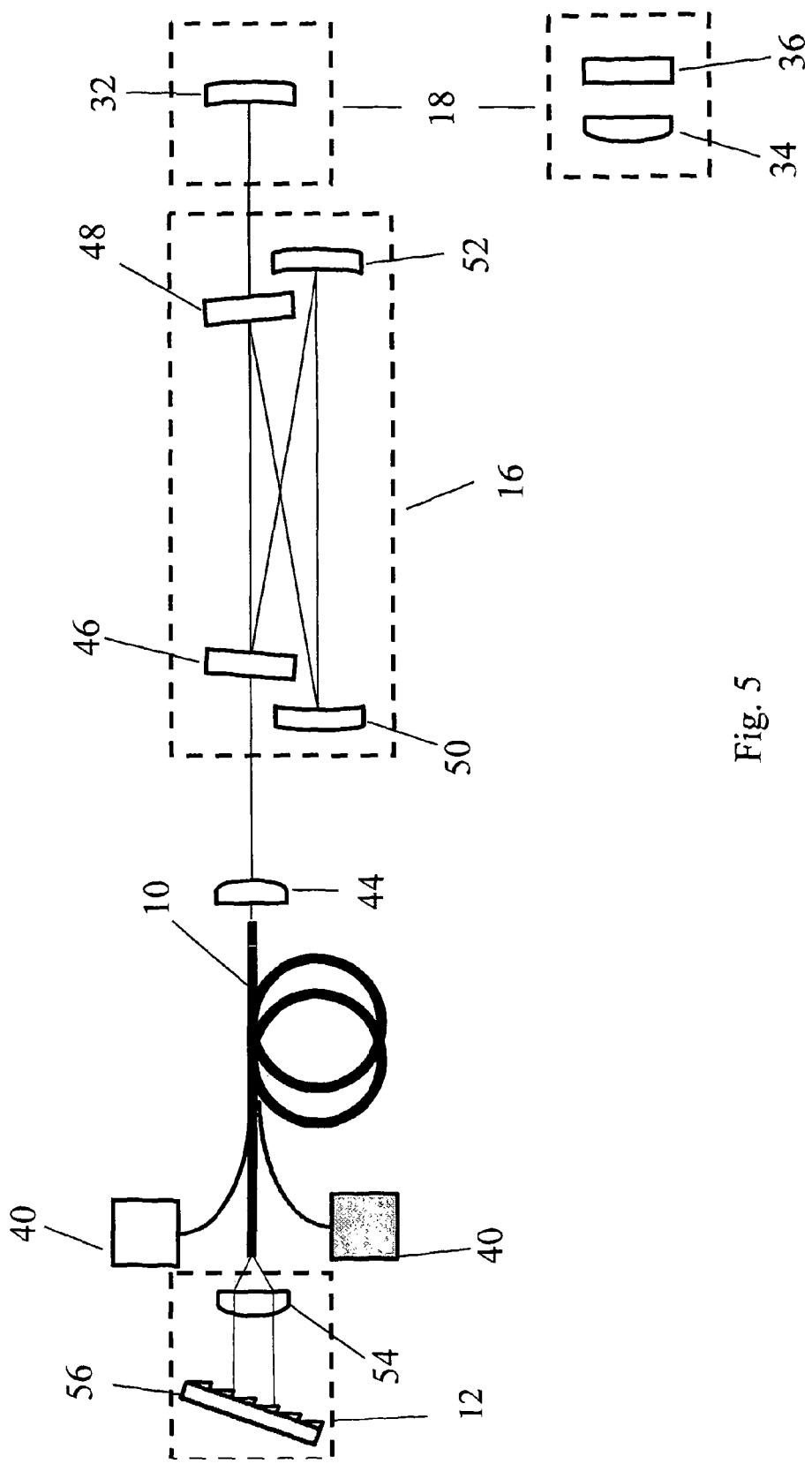
FIG. 5 shows a second embodiment with a standing-wave cavity configuration.
Figure 6:
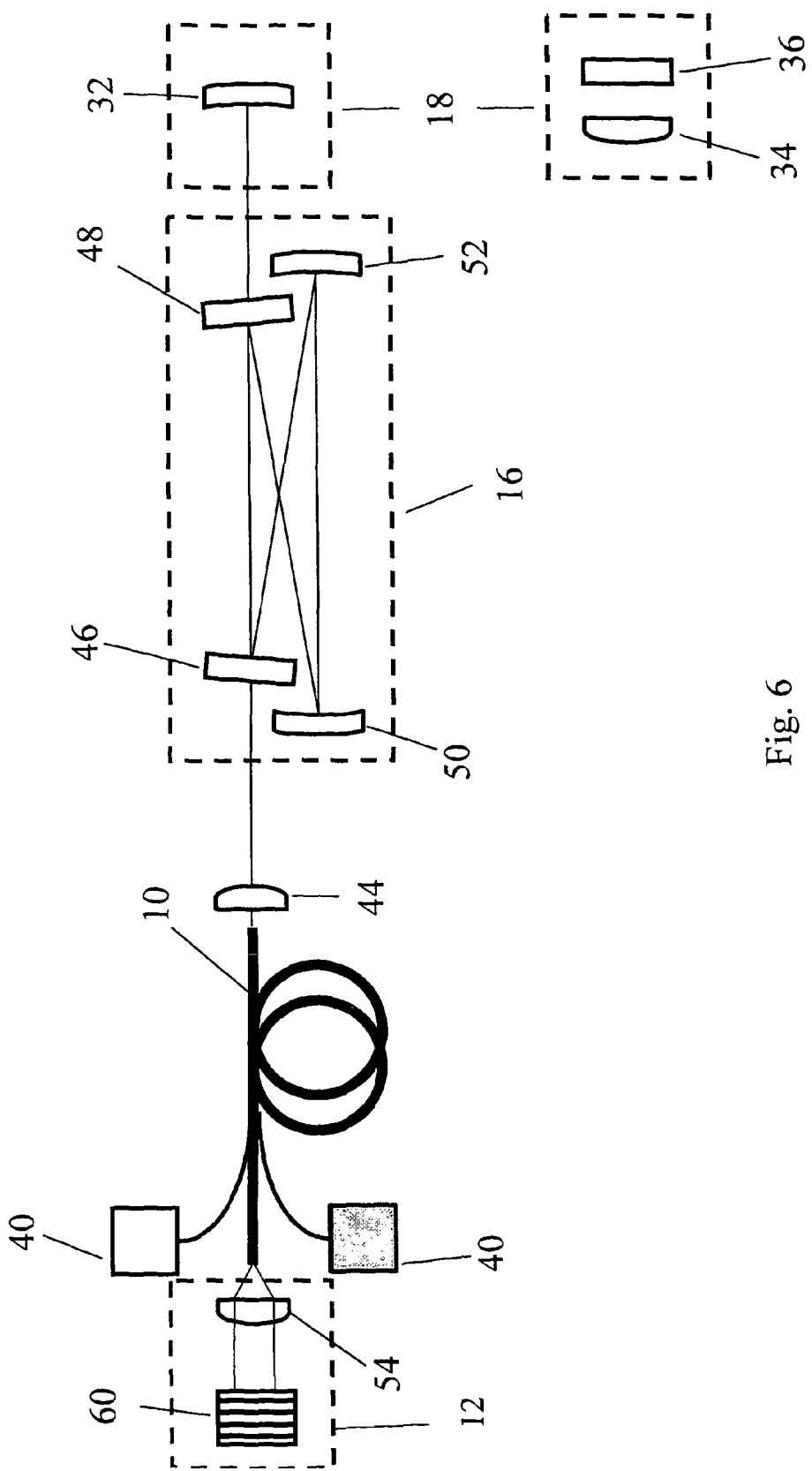
FIG. 6 shows a third embodiment with a standing-wave cavity configuration.

FIG. 5 and FIG. 6 show, by way of example, alternative wavelength-selective components 12 that may be employed instead of using a fiber Bragg grating. In all other respects the designs are the same as those of FIG. 4.

FIG. 5 employs as the wavelength-selective reflector 12 a diffraction grating 56 in the littrow configuration, thereby to provide wavelength dependent feedback. The grating is optically coupled to the fiber 10 by a suitable convex lens, or lens combination, 54 acting as a collimating lens. The angle of the diffraction grating can be adjusted to set the fiber laser's operating wavelength. The angle may be fixed by the design, or may be user adjustable to provide a tunable laser.

FIG. 6 employs as the wavelength-selective reflector 12 a volume Bragg grating (VBG).

The use of external feedback arrangements as in FIG. 5 and FIG. 6 has the drawback of added complexity, In some embodiments, the fiber gain medium 10 can be made of a multi-mode fiber. This allows use of a larger core area than for single-mode fibers which has the advantage of increasing the catastrophic facet damage threshold and the threshold for unwanted nonlinear loss processes, and thus facilitates further power scaling.

One way of accommodating multi-mode fiber is to spatially match the fiber output with the resonant enhancement cavity as now described.

The spatial matching approach is possible with the designs shown in FIG. 5 and FIG. 6 which use external reflectors 12. It would also be possible using a FBG, so long as the FBG was made in a section of single mode fiber, which could be spliced to the multi-mode fiber that provided the gain medium, so could also follow the design shown in FIG. 4.

The multi-mode output of the optical fiber 10 at the end optically adjacent to the second resonant cavity, i.e. the end at coupling lens 44, is spatially matched to the fundamental transverse mode TEM$_{00}$ of the second resonant enhancement cavity 16 so that the first resonant cavity is resonant for multi-mode amplification in the optical fiber. In this arrangement, a collection of transverse modes lase with relative phases on exiting the fiber gain stage such that the constituent beams interfere to yield a combined (resultant) beam that is spatially-matched to the fundamental transverse TEM$_{00}$ mode of the internal enhancement cavity 16.

In summary, when the optical fiber is multi-mode, i.e. comprising a fundamental mode and at least one higher order mode, the second resonant cavity supports simultaneous lasing on the fundamental mode and at least one of the higher order modes. The plurality of modes interfere to produce a combined beam which is spatially matched to the fundamental mode of the second resonant cavity.

This spatial matching approach differs from conventional approaches, such as bending or tapering, which are based on suppressing higher order modes in order to restrict lasing to the fundamental mode.

Another way of accommodating multi-mode fiber is to use a combination of a FBG and VBG to form the first resonant cavity as now described.

Figure 7:
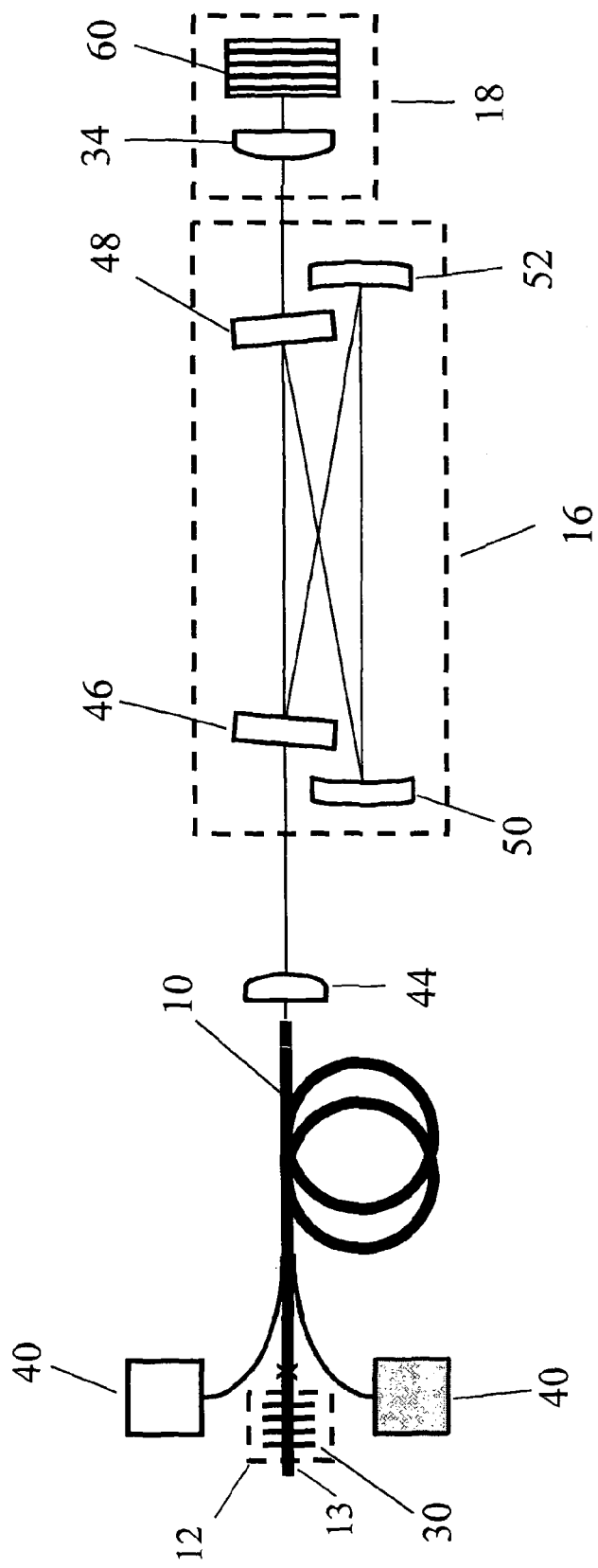
FIG. 7 shows a fourth embodiment with a standing-wave cavity configuration.

FIG. 7 shows, by way of example, an alternative implementation of the end reflector 18 using a volume Bragg grating (VBG) instead of the mirror used in FIG. 4. In all other respects the design of FIG. 7 is the same as that of FIG. 4.

The active ion doped fiber 10 has a multi-mode core and feedback for lasing is provided by a fiber Bragg grating 30 written into the multi-mode core (or a section of passive fiber with a matched multi-mode core spliced to the active fiber) and an external feedback cavity with a ring enhancement cavity 16 and a reflector 18.

In this embodiment, the end reflector 18 is realized as a volume Bragg grating (VBG) 60 coupled to the fiber 10 by a suitable collimating lens 34. The role of the VBG 60 is now explained. In a multi-mode fiber core, the number of allowed modes depends on the refractive index of the core ($n_1$), the refractive index of the surrounding cladding material ($n_2$) and the core diameter, where $n_1 > n_2$ for guidance. Each mode is characterized by an effective propagation constant and related effective refractive index ($n_{eff}$), where $n_1 > n_{eff} > n_2$. The exact value for $n_{eff}$ for a particular mode depends on the details of the fiber design and the mode, but as a rough guide low order modes have a smaller mode size than higher order modes and hence have a higher value for $n_{eff}$. The Bragg grating provides maximum reflectivity at wavelength, $\lambda_1 = 2 n_{eff} \Lambda_1$, where $\Lambda_1$ is the period of the grating. Hence, the wavelength at which the Bragg grating provides maximum reflectivity will decrease as the mode's effective refractive index decreases. Thus, higher order modes will experience a stronger reflection at shorter wavelengths than lower order modes. In contrast, the volume Bragg grating provides maximum reflectivity at wavelength, $\lambda_2$, given by $\lambda_2 = 2 n_v \Lambda_2$, where $\Lambda_2$ is the period of the grating and $n_v$ is approximately equal to the refractive index of the bulk material, which varies very little from mode to mode due to the absence of a waveguiding geometry. Thus, by satisfying the condition: $\Lambda_2 = n_f \Lambda_1 / n_v$, where $n_f$ is the effective index of the fundamental mode of the fiber it is possible to achieve lasing on only the fundamental mode. The filtering by the VBG supplements the mode filtering action provided by the resonant enhancement cavity. Other measures to help further suppress lasing on higher order modes (e.g. by bending the fiber) may be employed as well. The fiber laser source is configured so that the laser beam exiting the fiber gain stage is spatially-mode-matched to the fundamental ($TEM_{00}$) mode of the internal enhancement cavity to maximize the power coupled into the enhancement cavity.

It will be understood that more conventional ways of accommodating multi-mode fiber may also be used in embodiments of the invention, such as mode filtering by bending the fiber [9], and tapering the fiber to a single-mode fiber at the end adjacent to the FBG or external feedback cavity. These conventional approaches suppress higher order modes and restrict lasing to the fundamental mode. In the bending case, this is achieved in an optical fiber which is multi-mode, i.e. comprising a fundamental mode and at least one higher order mode, by a section of the optical fiber being bent such that bend-induced loss suppresses lasing on the higher order mode(s) to produce a single mode output. In the tapering case, this is achieved in an optical fiber which is multi-mode, i.e. comprising a fundamental mode and at least one higher order mode, by connecting the multi-mode optical fiber via a tapered section to a single-mode fiber to suppress lasing on the higher order mode(s).

Figure 8:
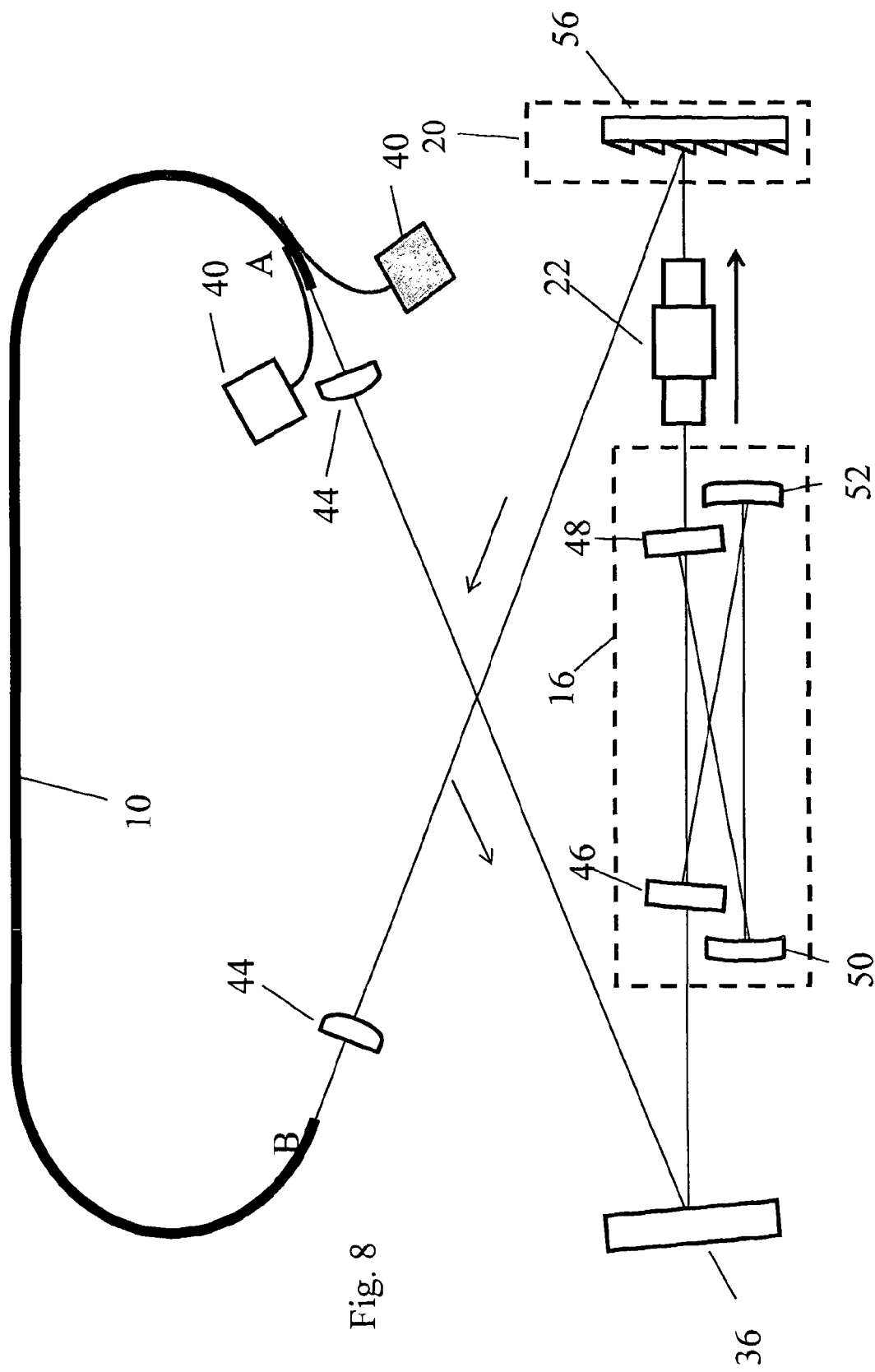
FIG. 8 shows a first embodiment with a ring cavity configuration.

FIG. 8 shows an example implementation of the basic ring resonator configuration design of FIG. 2. The main components already described with reference to FIG. 2 are shown, namely a portion of optical fiber 10, an internal resonant enhancement cavity 16, a wavelength-selective element 20, and a unidirectional device 22 to force unidirectional lasing in the ring.

The resonant enhancement cavity 16 is the same design as shown in FIG. 4. Namely, the internal enhancement cavity 16 is configured as a ring resonator and comprises first and second plane mirrors 46 and 48, and two curved mirrors 50 and 52. Alternatively, a standing-wave enhancement cavity can be employed if desired, which may be an attractive option for ring cavity embodiments in particular.

The wavelength selective element 20 is implemented as a diffraction grating 56.

Pump lasers 40 are connected by respective fibers to the gain fiber 10 via suitable couplers. Two pump lasers 40 are illustrated, but it will be appreciated that the number of pump lasers can be chosen as desired, and may be 1, 2, 3, 4 or more. For the couplers, multi-mode pump couplers may be used (also known as tapered fiber bundles).

Following standard practice, both ends of the active fiber 10—labeled A and B in the drawing—should be terminated (e.g. by cleaving, polishing, using an antireflection coating or splicing to an end-cap) so as to reduce broadband feedback from the fiber end facets to help prevent parasitic lasing between the ends of the fiber. Laser light exiting End A of the fiber 10 is collimated and conditioned using one or more lenses 44 and, if necessary re-directed using one or more high reflectivity mirrors 36 so that the beam is spatially-matched the fundamental ($TEM_{00}$) mode of the enhancement cavity 16 to maximize the laser power coupled into the enhancement cavity.

The fiber laser automatically operates on axial modes (within the wavelength band defined by the diffraction grating 56) that are resonant in the enhancement cavity, since all other axial modes have a much higher loss and are therefore suppressed. Laser radiation which is coupled into the enhancement cavity via mirror 46 is resonated and a small fraction of this power is transmitted through mirror 48 and is coupled back into End B of the active fiber 10 via the unidirectional device 22, diffraction grating 56 and an arrangement of one or more lenses 44 to achieve lasing. The overall feedback efficiency to the active fiber 10 depends, amongst other things, on the reflectivities of mirrors 46, 48, 50 and 52, so these should be selected to yield high intracavity power in the enhancement cavity whilst at the same time allowing sufficient feedback to the active fiber to ensure efficient lasing. Typically, mirror 48 has a low transmission of ~0.5-2% at the lasing wavelength, mirrors 50 and 52 have very high reflectivity (>99.8%) and the transmission of mirror 46 is selected to be approximately equal to the round-trip loss of the enhancement cavity (i.e. excluding the transmission of mirror 46) to satisfy the condition for impedance matching to ensure a large fraction of the laser power from the active fiber 10 incident on mirror 46 is coupled into the enhancement cavity.

Laser radiation may be coupled out of the enhancement cavity by making one of the mirrors 50 or 52 partially transmitting (whilst maintaining impedance matching) to provide a useful output beam.

Other output options include wavelength conversion of the laser radiation to useful laser radiation at another wavelength, for example by nonlinear frequency conversion in a nonlinear crystal placed in the enhancement cavity, or by optical pumping of another laser material placed in the enhancement cavity.

Figure 9:
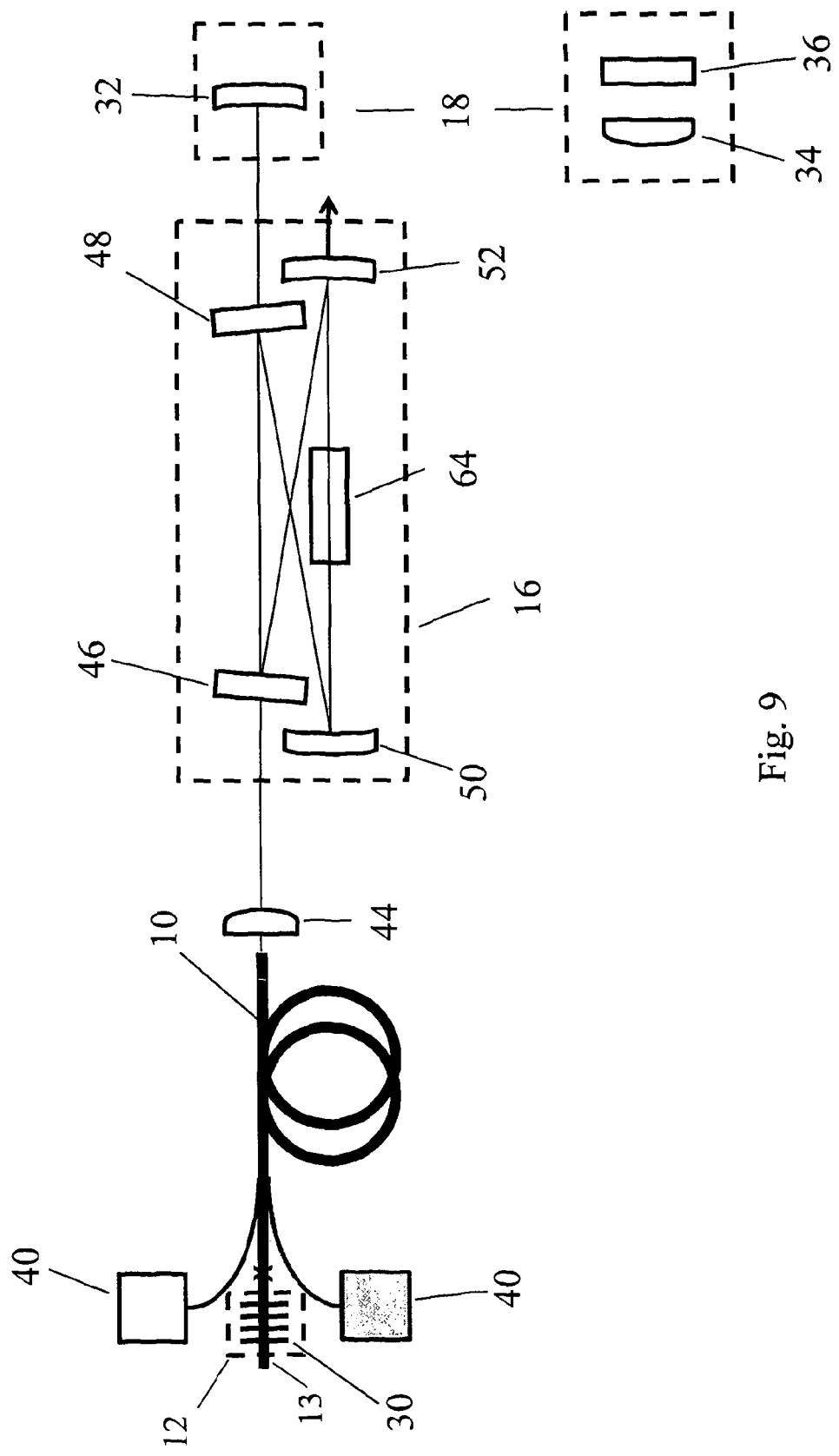
FIG. 9 shows a fifth embodiment with a standing-wave cavity configuration.

FIG. 9 shows an embodiment of the fiber laser source configured for second harmonic generation (SHG). The design is the same as that of FIG. 4, but with the addition of a nonlinear crystal 64 placed in the enhancement cavity 16.

The nonlinear crystal may be LBO, BBO, periodically-poled lithium tantalite or another crystal with favorable optical and nonlinear properties.

The SHG exploits the high intracavity power that can be achieved in the resonant enhancement cavity to achieve high conversion efficiency from the fundamental lasing wavelength to the second harmonic wavelength. This provides an attractive method of generating high power in the visible wavelength regime from fiber lasers (e.g. based on rare earth active ions) operating in the near infrared wavelength regime.

The resonant enhancement cavity 16 should also provide a small intracavity beam waist in the nonlinear crystal for the purpose of maximizing the second harmonic conversion efficiency and one of the mirrors (preferably mirror 52) should, in addition to having high reflectivity at the fundamental lasing wavelength, have high transmission at the second harmonic wavelength. Also, the wavelength dependent feedback element 12 (in this case, an FBG 30) should restrict laser emission to the wavelength band required for phase matching (or quasi-phase matching in the case of periodically-poled crystals). The principle of operation of the fiber laser source is as described earlier for previous embodiments. However, in this case useful laser output is derived by intracavity conversion from the fundamental wavelength to the second harmonic wavelength in the resonant enhancement cavity. Thus, in order to satisfy the condition for impedance matching to maximize the power coupled into the enhancement cavity, the transmission of mirror 46 should be equal to the intracavity second harmonic conversion efficiency plus the other losses in the enhancement cavity (excluding the transmission of mirror 46). By arranging for the second harmonic conversion efficiency to dominate the other resonator losses, it is possible to achieve very high overall conversion efficiency to the second harmonic wavelength in a high quality (diffraction-limited) output beam.

The resonant enhancement cavity 16 is shown as having a free space construction. An alternative would be a monolithic construction with the mirror functionality being achieved through suitable coating of end facets of the crystal 64. This approach may also be applied in variations of the other illustrated embodiments.

This approach can be extended to ring cavity configurations of the general type shown in FIG. 2, and such as the specific example of FIG. 8. It is also possible to employ different designs for the enhancement cavity and also different feedback arrangements.

A second nonlinear crystal (not shown) selected for frequency doubling of the second harmonic beam to the fourth harmonic may also be arranged in the enhancement cavity and serves to provide output at shorter wavelengths, for example, in the ultraviolet. The conversion efficiency to the fourth harmonic can be enhanced by using mirrors (46, 48, 50 and 52) that also have high reflectivity at the second harmonic wavelength to increase the intracavity power.

The same design as FIG. 9 may be used, wherein nonlinear crystal 64 is selected for use in an optical parametric oscillator (OPO), thereby to generate longer wavelength output, for example, in the mid-infrared wavelength regime. This may be LBO, BBO, periodically-poled lithium tantalite or another suitable nonlinear crystal with favorable optical and nonlinear properties. The OPO can exploit the high intracavity power that can be achieved in the resonant enhancement cavity to achieve high conversion efficiency from the fundamental lasing wavelength to signal and idler wavelengths.

The resonant enhancement cavity should also resonate the signal wavelength (i.e. for a singly resonant optical parametric oscillator), so mirrors 46, 48, 50 and 52 should also have high reflectivity at the signal wavelength. One of these mirrors should be partially transmitting at the signal wavelength to couple out power at the signal wavelength and one mirror (preferably mirror 52) should have a high transmission at the idler wavelength to couple out power at the idler wavelength.

Figure 10:
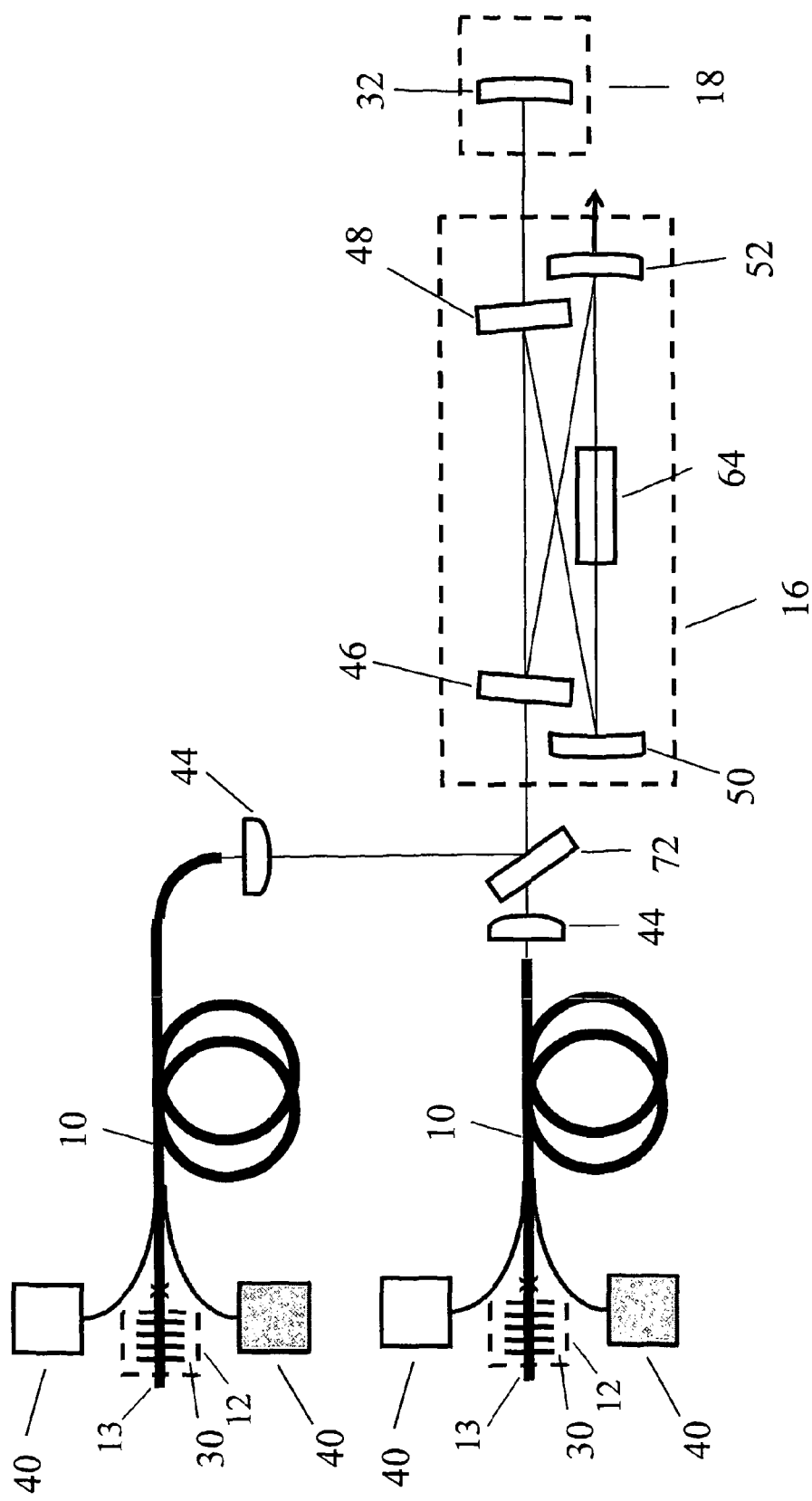
FIG. 10 shows a sixth embodiment with a standing-wave cavity configuration configured for sum frequency or difference frequency generation.

FIG. 10 shows another embodiment based on FIG. 4, but in which the gain fiber 10 and first reflector 12 are replicated. Two fiber laser gain elements 10 are shown which operate at different wavelengths and are combined into a single beam using a dichroic mirror 72. Alternatively, a volume Bragg grating at near normal incidence may be used to combine the beams. The two wavelengths share a common external feedback cavity 16, 18 with a resonant enhancement cavity 16 containing a nonlinear crystal 64 selected for sum-frequency generation or for difference frequency generation. Mirrors 46, 48, 50 and 52 should be selected to maximize the intracavity power in the enhancement cavity at the wavelengths from both fiber gain stages to achieve efficient sum-frequency generation or difference frequency generation. One of the mirrors (preferably mirror 52) should also have high transmission at the sum-frequency or difference-frequency wavelength to maximize the output power at said wavelengths.

In a variant of the design of FIG. 10, the nonlinear crystal is configured for use as an optical parametric oscillator to generate longer wavelength output. The wavelengths of the fiber gain stages are selected so that both lie within the phase matching bandwidth for nonlinear frequency conversion via parametric generation. Mirrors 46, 48, 50 and 52 should be selected to maximize the intracavity power in the enhancement cavity at the wavelengths from both fiber gain stages and to achieve efficient operation of the enhancement cavity as a singly-resonant optical parametric oscillator. One of the mirrors (preferably mirror 52) should also have high transmission at the idler wavelength to allow efficient extraction of power at this wavelength. In addition, one of the mirrors (46, 48, 50 or 52) should be partially transmitting at the signal wavelength to allow efficient extraction of power at the signal wavelength. The output beams from two or more fiber gain stages (with different operating wavelengths) can be combined in this way and used to pump an optical parametric oscillator providing their operating wavelengths lie within the phase matching bandwidth for the nonlinear frequency conversion process. A second nonlinear crystal selected for frequency doubling the signal radiation may be inserted in the enhancement cavity for further wavelength flexibility.

Figure 11:
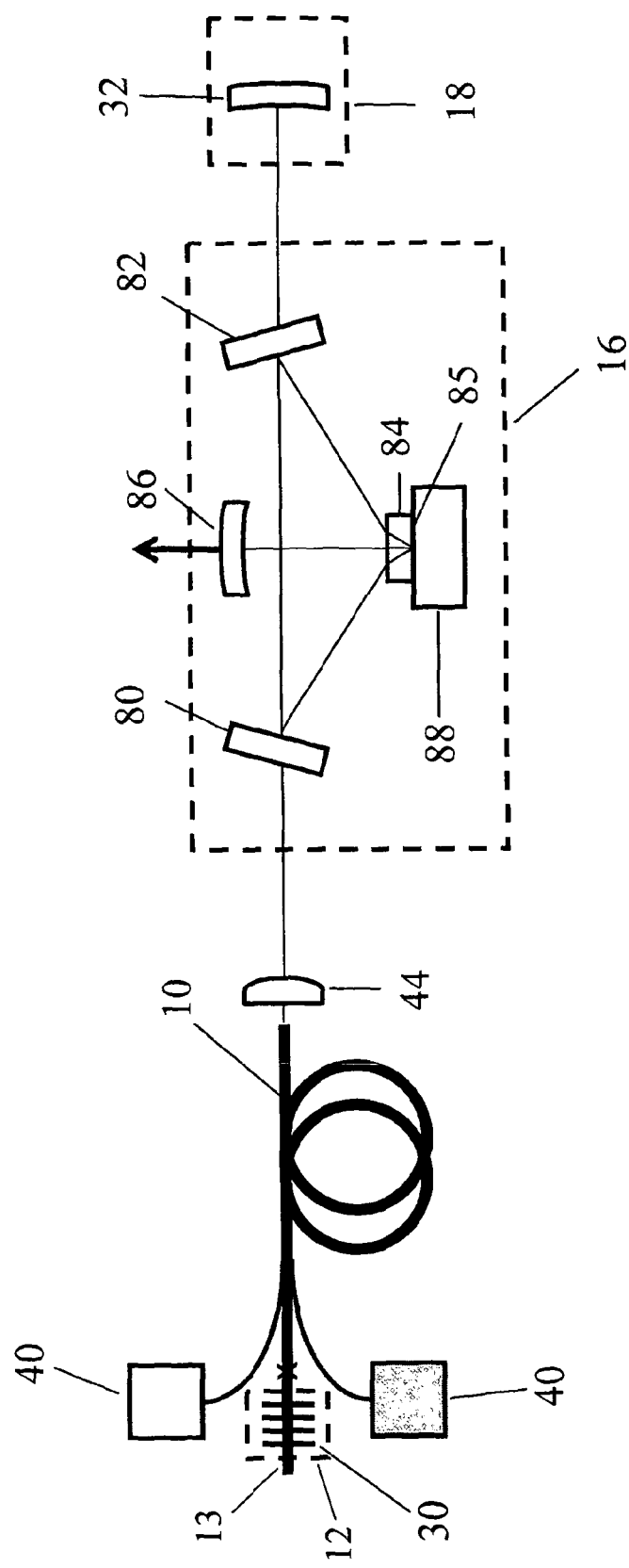
FIG. 11 shows an embodiment with a standing-wave cavity configuration configured for pumping a thin-disk solid-state laser.

FIG. 11 shows a device according to a further embodiment in which laser output from the fiber is used to optically pump a solid-state laser employing a thin-disk geometry. The basic structural design is the same as that of the embodiment of FIG. 4, differing only in the internal structure of the enhancement cavity 16. The description of the common parts is not repeated.

The internal enhancement cavity 16 comprises mirrors 80, 82 and 85, as well as a thin-disk laser medium 84 which is bonded to a heat sink 88 which may be actively cooled. Mirrors 80 and 82 are partially transmitting at the fiber laser's operating wavelength respectively to couple power into the enhancement cavity 16 and to couple a small fraction of the power out of the enhancement cavity (i.e. to provide feedback for lasing). Mirror 85 is a high reflectivity coating 85 applied directly to the thin-disk laser medium 84, between the laser medium 84 and heat sink 88. For efficient operation, the transmission of mirror 80 should be approximately equal to the round-trip loss of the enhancement cavity (i.e. excluding the transmission of mirror 80) to satisfy the impedance matching condition and ensure that a large fraction of the fiber laser power is coupled into the enhancement cavity.

If the double-pass absorption efficiency of the output of the fiber laser in the thin-disk 84 is large compared to other sources of loss (i.e. excluding the transmission of mirror 80), then most of the power that enters the enhancement cavity 16 will be absorbed in the thin-disk 84 to provide efficient optical pumping. Laser operation of the thin-disk laser can then be achieved using a resonator configuration comprising the thin-disk itself as the end reflector and a mirror 86 (or mirror combination) acting as the output coupler, thereby to yield laser output at the disk laser's operating wavelength.

Face-cooled thin-disk lasers offer a high degree of immunity to effects of heat generation in the laser medium, since heat flow is predominantly axial. This allows scaling to very high powers whilst maintaining high efficiency and good beam quality. However, one drawback of this laser geometry is that the single-pass pump absorption efficiency is generally rather poor, so the pump light must be passed through the disk many times to achieve a high pump absorption efficiency and hence high overall efficiency.

The design of the present embodiment overcomes this limitation by placing the thin-disk of laser material inside the resonant enhancement cavity to enhance the pump absorption efficiency. This approach should be attractive for efficient pumping of thin disk laser materials that have absorption lines at wavelengths that can be reached by active ion doped fiber lasers. One example of this would be Tm fiber laser pumping of a Cr:ZnSe thin-disk laser to yield output in the ~2-3 µm wavelength band. Multiple (wavelength-combined) fiber lasers could be employed with operating wavelengths selected to lie within the absorption band of the solid-state laser material to facilitate power scaling.

In variants of this design, the thin-disk laser can be replaced with rod and slab laser geometries and other laser media, where resonant enhancement of the pump radiation is required to improve the pump absorption efficiency to achieve efficient lasing. Also, alternative enhancement cavity designs may be employed to achieve efficient pump absorption. One or more fiber pump lasers (wavelength-combined), optionally in combination with a different pump laser (e.g. diode laser) to address different absorption lines, may be employed to excite active ions to higher lying levels for visible laser emission.

Figure 12:
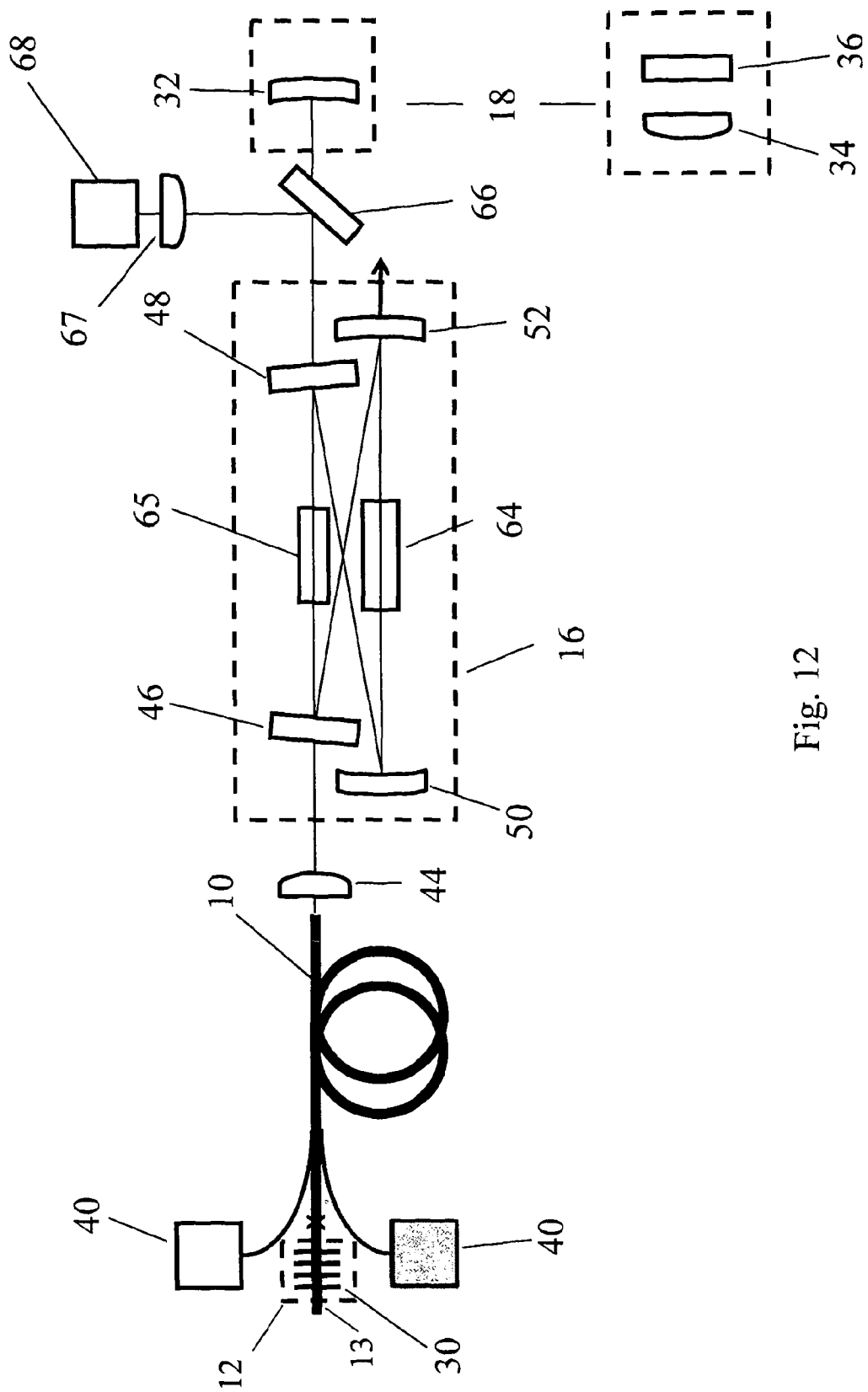
FIG. 12 shows an embodiment with a standing-wave cavity configuration used for sum frequency or difference frequency generation with a bulk solid-state laser.

FIG. 12 shows an embodiment of the fiber laser source configured for efficient generation of the sum-frequency (or difference-frequency) of the fiber laser's fundamental lasing wavelength and fundamental lasing wavelength of a 'bulk' solid-state laser. The design is based on the architecture shown in FIG. 4, but with the addition of a nonlinear crystal 64 in the enhancement cavity 16 and a 'bulk' laser medium 65. The nonlinear crystal may be LBO, BBO, periodically-poled lithium tantalite or another crystal with favorable optical and nonlinear properties. In this configuration the enhancement cavity 16 also acts as a laser resonator for the 'bulk' solid-state laser, which is optically pumped by a pump laser 68 with the aid of a wavelength selective element 66 (e.g. a dichroic mirror) using pump beam collection and delivery optics 67. Alternatively, pump light from the pump laser 68 can be delivered through a reflector 32, if the appropriate dielectric coating (i.e. with high transmission at the pump wavelength and high reflectivity at the fiber laser's operating wavelength) is used. The intracavity power of the fiber laser, resonantly enhanced in the enhancement cavity 16, is then mixed with the intracavity power of the 'bulk' solid state laser via the appropriate nonlinear process (i.e. sum-frequency generation or difference-frequency generation) in the nonlinear crystal 64 and the frequency-mixed output can be extracted through one of the mirrors (preferably mirror 52) of the resonant enhancement cavity 16.

Figure 13:
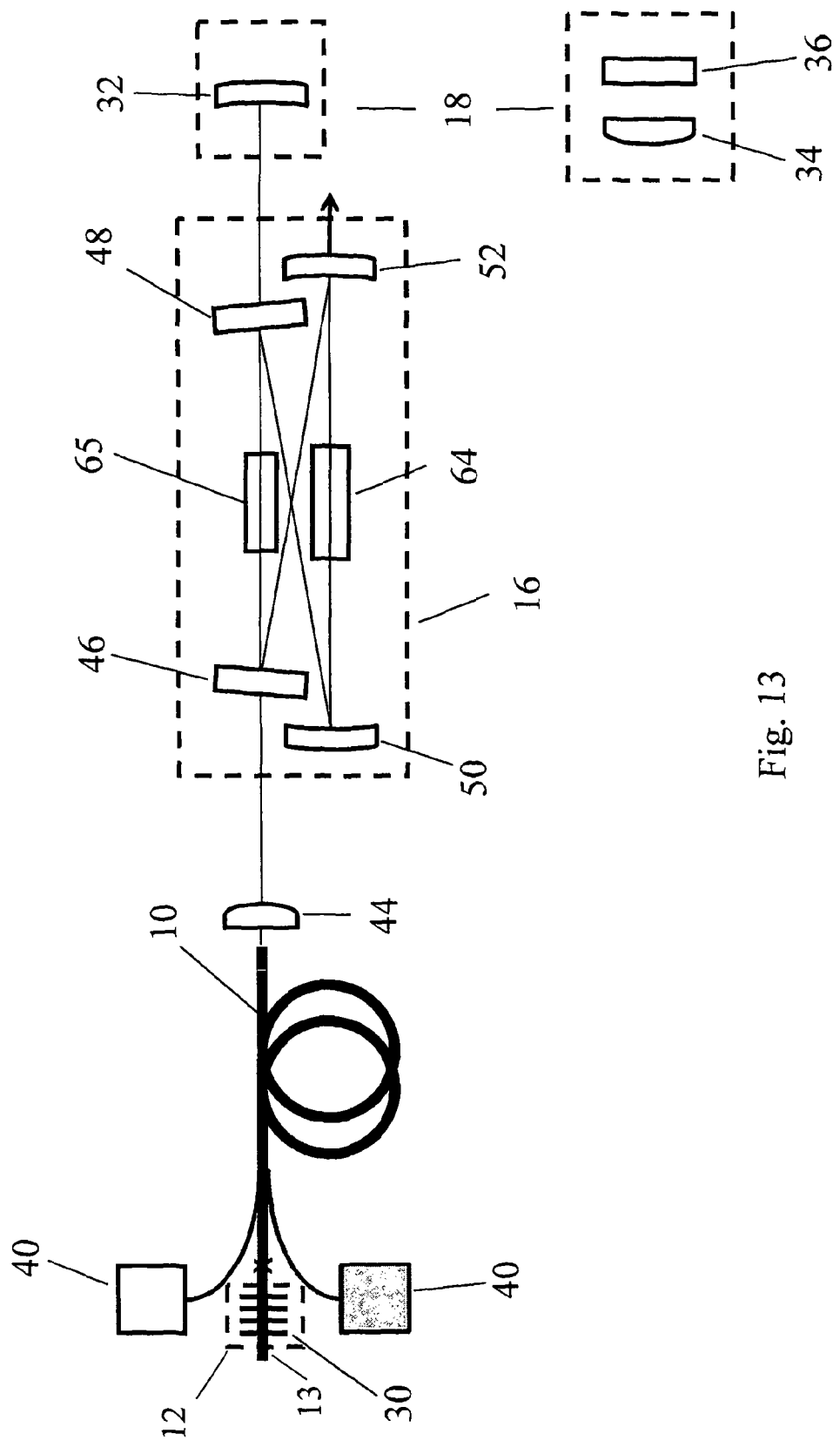
FIG. 13 shows an embodiment with a standing-wave cavity configuration used for pumping a bulk solid-state laser and for sum frequency or difference frequency generation.

FIG. 13 shows an embodiment of the fiber laser configured for a similar purpose as the embodiment shown in FIG. 12. However, in this example the fiber laser is also used to pump the 'bulk' solid-state laser. The enhancement cavity 16 is used to enhance the intracavity power of the fiber laser allowing efficient absorption in a weakly absorbing bulk laser medium 65 and also acts as the resonator for the 'bulk' solid-state laser. The intracavity power of the 'bulk' solid-state laser (at main emission wavelength of the 'bulk' laser medium) is then frequency-mixed with resonantly enhanced intracavity power of the fiber laser via desired nonlinear frequency conversion process (i.e. sum-frequency generation or difference-frequency generation) in the nonlinear crystal 64 to yield frequency converted output through one of the mirrors (preferably mirror 52) of the resonant enhancement cavity 16.

Figure 14:
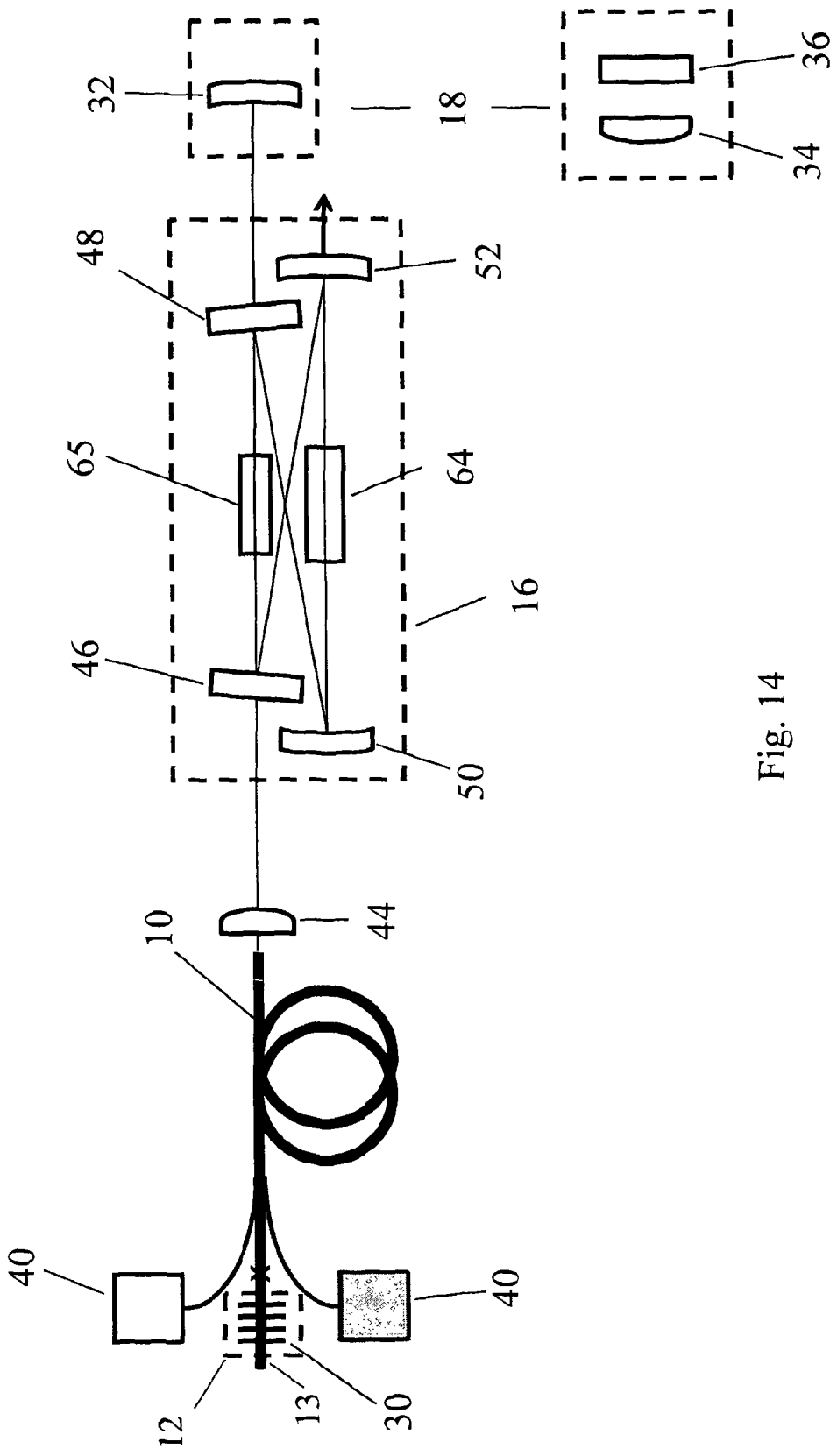
FIG. 14 shows an embodiment with a standing-wave cavity configuration used for pumping a bulk solid-state laser and for intracavity frequency doubling of the bulk laser.

FIG. 14 shows another embodiment configured for efficient intracavity pumping of a bulk solid-state laser and efficient intracavity-frequency-doubling of the fundamental wavelength of the 'bulk' solid-state laser. The design is very similar to the embodiment shown in FIG. 13, but with the nonlinear crystal 64 phase-matched for efficient frequency doubling at the bulk laser's operating wavelength. The frequency-doubled output can be extracted through one of the mirrors of the resonant enhancement cavity 16.

Figure 15:
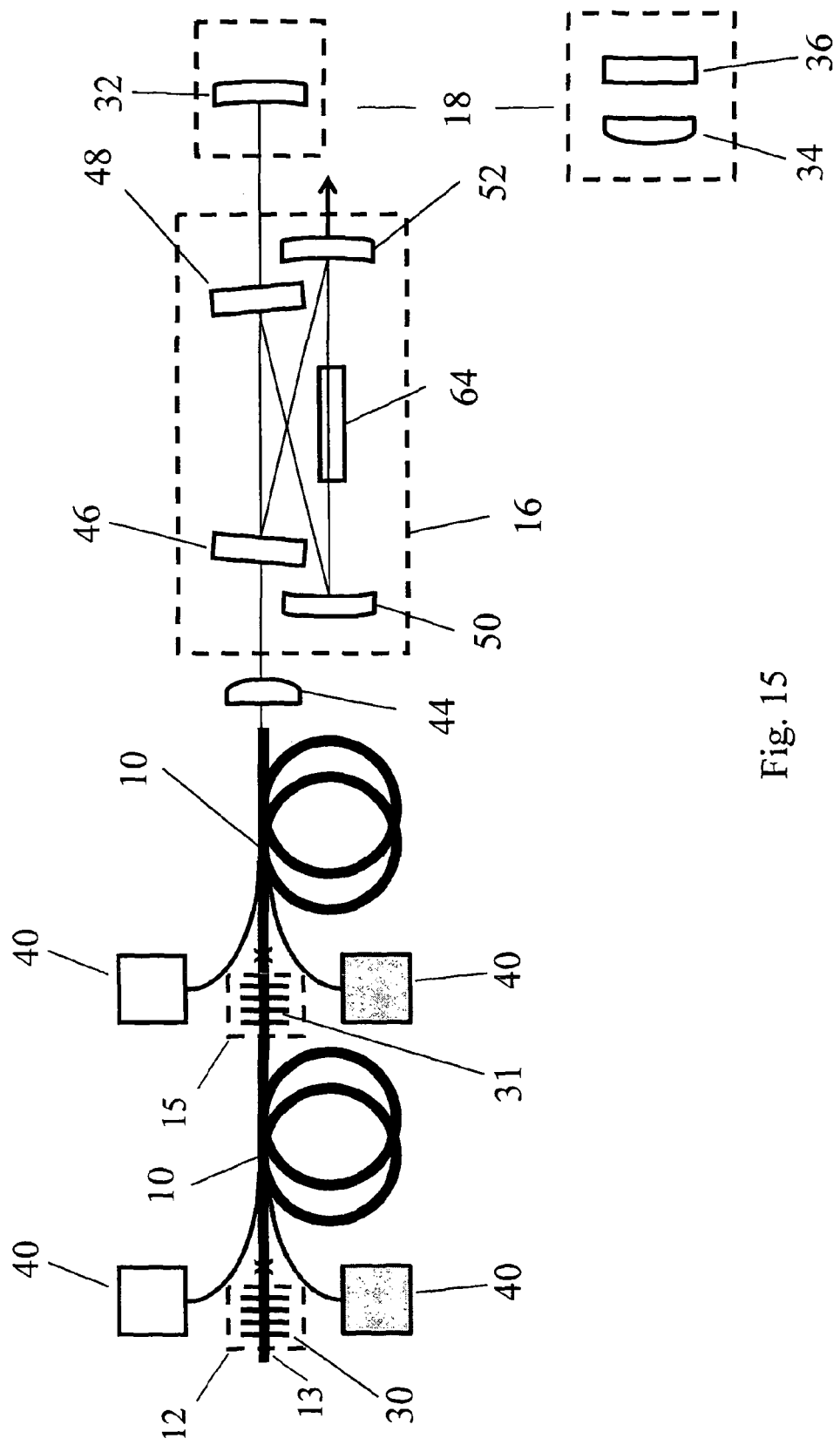
FIG. 15 shows a seventh embodiment with a standing-wave cavity configuration used for sum frequency or difference frequency generation.

FIG. 15 shows an embodiment of the fiber laser configured for a similar purpose as that of the embodiment in FIG. 10. Two fiber laser gain elements 10 operating at different wavelengths are arranged in series (e.g. by splicing the fibers together). Feedback for lasing for the first fiber laser is provided by reflectors 32 and 12, and feedback for lasing for the second fiber laser is provided by reflectors 32 and 15. Reflectors 13 and 15 may be fiber Bragg gratings 30 and 31 respectively written into the active fibers 10 or written into passive fibers spliced to the active fibers 10. The fiber Bragg gratings 30 and 31 are designed to provide high reflectivity at the desired operating wavelengths within the gain bandwidths of the active ion doped fibers 10. The active fibers 10 typically have different active ions to provide gain for lasing at different wavelengths. In this configuration, the gain element of the second fiber laser is part of the resonator of the first fiber laser. The outputs from both fiber lasers are resonantly enhanced in the enhancement cavity 16 and then frequency mixed via sum-frequency generation (or difference-frequency generation) in the nonlinear crystal 64. The sum-frequency (or difference-frequency) output can be extracted through one of the mirrors (preferably mirror 52) of the resonant enhancement cavity 16.

Figure 16:
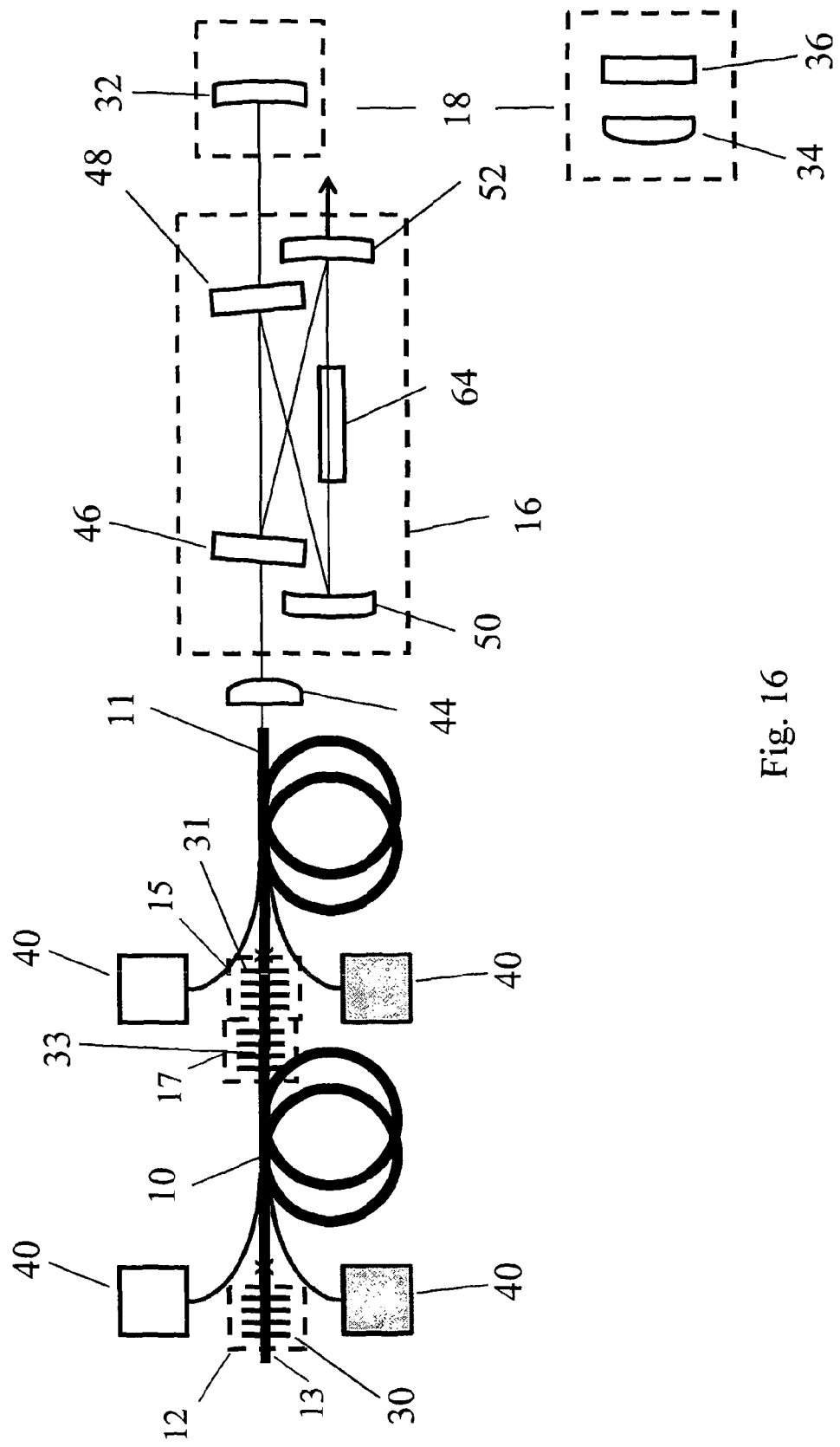
FIG. 16 shows an embodiment with a standing-wave cavity configuration used for frequency doubling of a Raman fiber laser.

FIG. 16 shows an embodiment of the fiber laser source configured frequency doubling of a Raman fiber laser. The resonant enhancement cavity 16 and end reflector 18 has the same construction as the embodiment of FIG. 9. This embodiment differs from previous embodiments, since the output from a fiber laser, based on an active-ion-doped fiber 10, is used to pump a Raman fiber laser, based on a Raman gain fiber 11. Feedback for lasing for the fiber laser is provided by reflectors 12 and 17, which are implemented as FBGs 30 and 33 respectively. The fiber laser emits laser radiation at a wavelength defined by the period of FBGs 30 and 33, and FBG 33 is designed to partially transmit the fiber laser radiation to provide an output for pumping the Raman fiber laser. Feedback for oscillation for the Raman fiber laser is provided by reflector 15, which is implemented as a FBG 31, and by a reflector 32, which is implemented as a mirror element. The period of the FBG 31 is selected to transmit the fiber laser radiation and reflect the Raman-shifted (Stokes) wave. The Stokes-shifted output beam from the Raman gain fiber 11 is resonantly enhanced in the enhancement cavity 16, in the same way as for the conventional fiber lasers described in the previous embodiments, allowing efficient nonlinear frequency conversion of the Stokes wave via frequency doubling in a nonlinear crystal 64. The frequency-doubled output can be extracted through one of the mirrors (preferably mirror 52) of the resonant enhancement cavity 16. This approach allows access to an extended range of operating wavelengths. Further extension of the operating wavelength range can be achieved using a cascaded Raman fiber laser architecture to achieve efficient operation on higher order Stokes waves, which can subsequently be resonantly enhanced as described in previous embodiments for the purpose of efficient nonlinear frequency conversion or efficient optical pumping of weakly absorbing solid-state laser materials.

Figure 17:
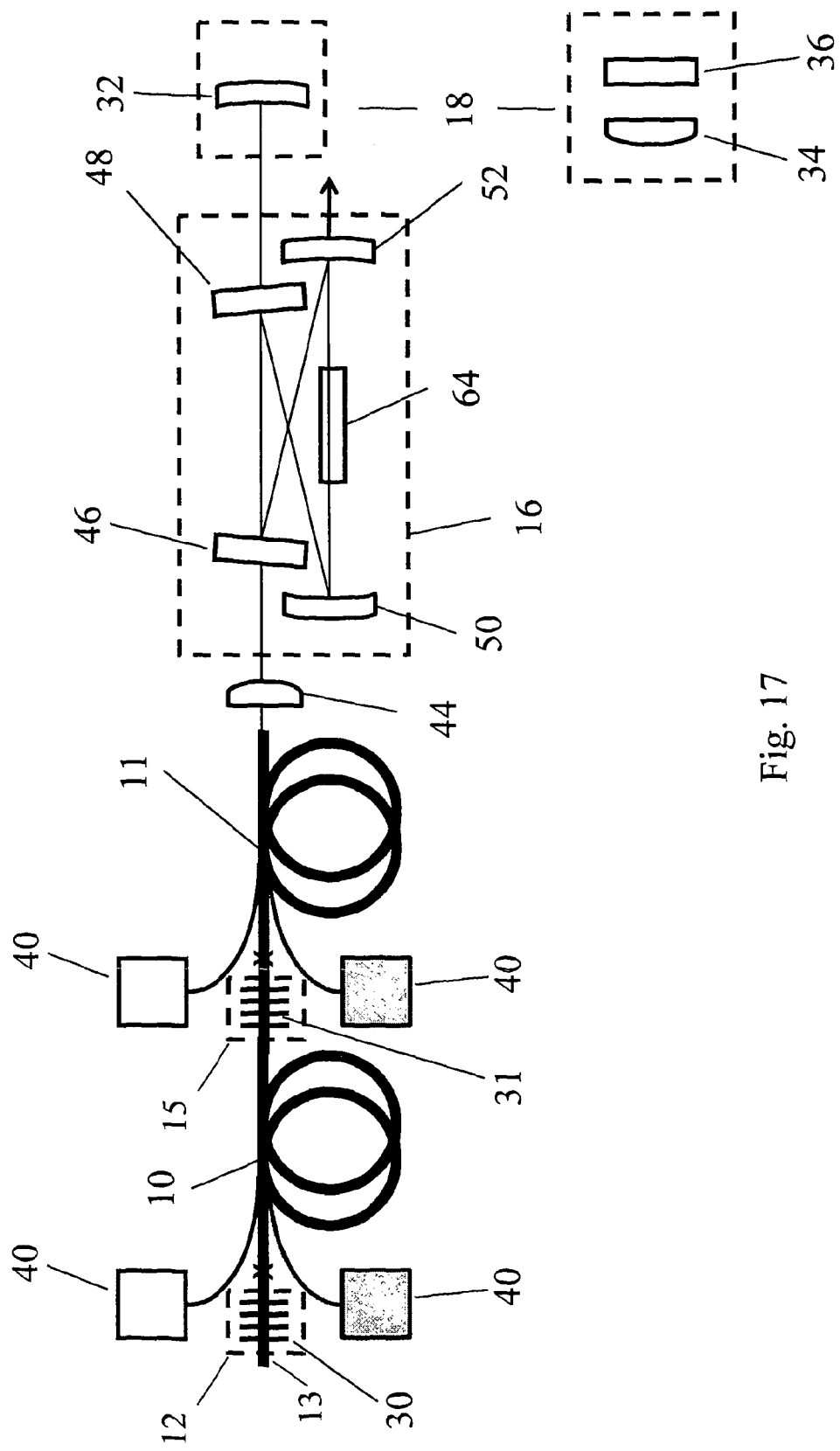
FIG. 17 shows an embodiment with a standing-wave cavity configuration used for sum frequency or difference frequency generation with a conventional fiber laser and Raman fiber laser.

FIG. 17 shows an embodiment of the fiber laser source configured for frequency mixing of the fiber laser's fundamental operating wavelength and the Stokes wave from a Raman fiber laser. The design is the similar to the embodiment shown in FIG. 16, but there is no reflecting means 17, so the fiber laser oscillates between reflecting means 12 and 32. Thus, in this configuration the intracavity power from both the fiber laser and the Raman fiber laser are enhanced in the enhancement cavity 16 and can be frequency mixed to generate output at the sum-frequency (or difference-frequency) using nonlinear crystal 64. The frequency-mixed output can be extracted through one of the mirrors (e.g. the mirror 52) of the resonant enhancement cavity 16. This approach can be extended to allow frequency mixing of the fiber laser output with higher order Stokes waves using a modified Raman fiber laser design.

Figure 18:
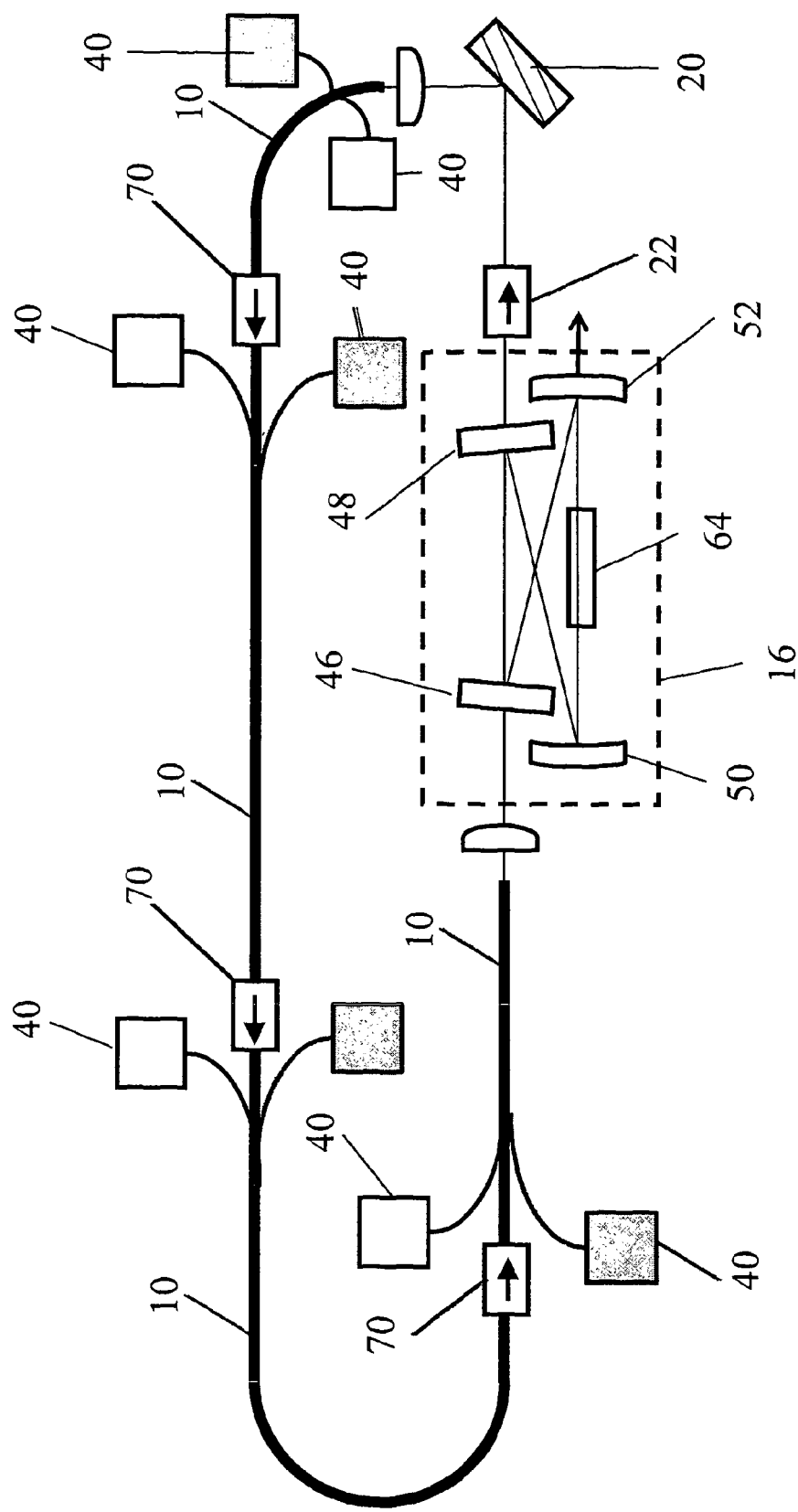
FIG. 18 shows a third embodiment with a ring cavity configuration used for frequency doubling.

FIG. 18 shows an embodiment of the fiber laser source configured as a multi-gain-stage ring oscillator. A plurality of gain fibers 10—four in the figure—are doped with active-laser-ions and form a series of fiber gain stages with increasing core size in the direction of propagation. The gain stages are separated from each other with isolators 70 to prevent parasitic lasing between gain stages. In addition, a free space isolator 22 is provided between the resonant enhancement cavity 16 and the first gain stage of the fiber laser. A wavelength selective element (e.g. a VBG) can be positioned between the resonant enhancement cavity 16 and the first gain stage of the fiber laser to select the lasing wavelength and laser emission bandwidth. A nonlinear crystal 64 is used for frequency doubling of resonantly enhanced intracavity power. Further or fewer fiber gain stages may be employed as desired.

Figure 19:
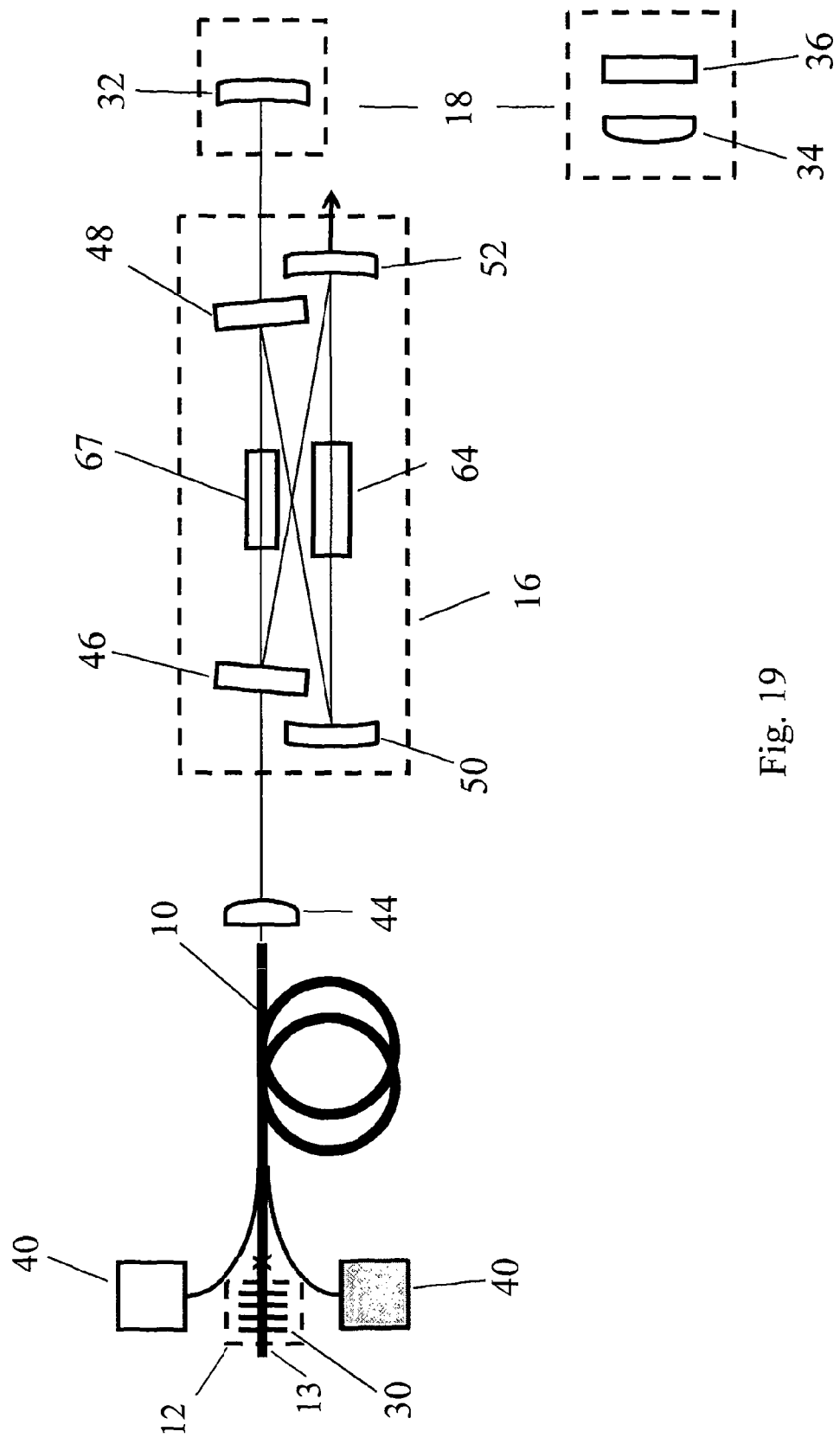
FIG. 19 shows an embodiment with a standing-wave cavity configuration used for pumping a bulk Raman laser and for frequency doubling of the Raman laser.

FIG. 19 shows an embodiment of the fiber laser source configured as a fiber-laser-pumped intracavity-frequency-doubled 'bulk' Raman laser. In this configuration a 'bulk' Raman gain medium 67 is pumped by the resonantly enhanced intracavity power of the fiber laser. The resonant enhancement cavity 16 is used to enhance the intracavity power of the fiber laser and also acts as a resonator for a 'bulk' Raman laser. The nonlinear crystal 64 is used for frequency doubling of the Raman-laser (Stokes-shifted) wavelength. The frequency-doubled output can be extracted through one of the mirrors (preferably mirror 52) of the resonant enhancement cavity 16.

Figure 20:
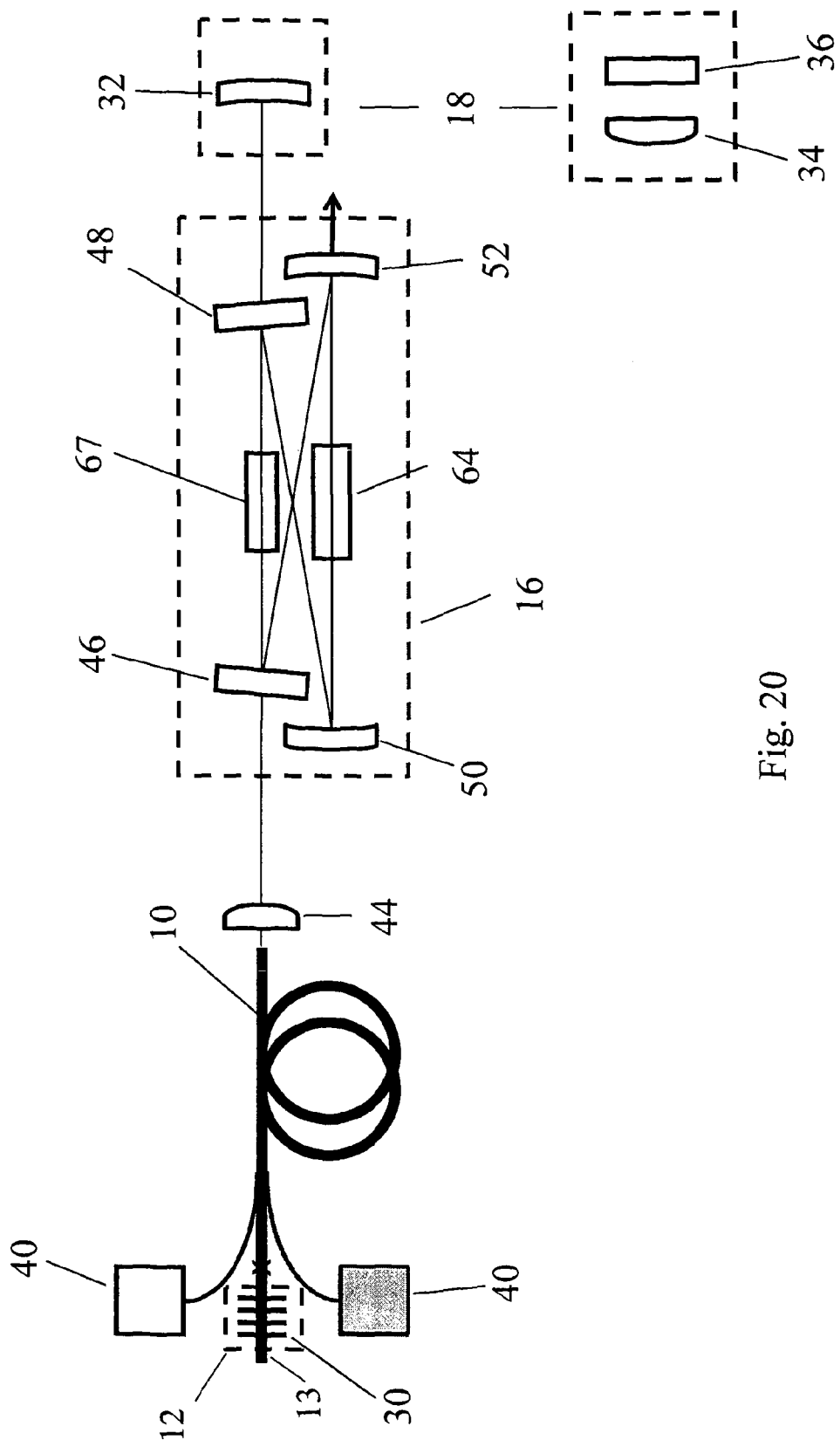
FIG. 20 shows an embodiment with a standing-wave cavity configuration used for pumping a bulk Raman laser and for sum frequency or difference frequency generation.

FIG. 20 shows another embodiment of the fiber laser source configured as a fiber-laser-pumped 'bulk' Raman laser. In this embodiment the nonlinear crystal 64 is selected to generate output at the sum-frequency (or difference-frequency) of the fiber laser and Raman laser. The frequency-mixed output can be extracted through one of the mirrors (preferably mirror 52) of the resonant enhancement cavity 16.

REFERENCES

[1]: G. D. Boyd, D. A. Kleinman, "Parametric interaction of focused Gaussian light beams," J. Appl. Phys. 39, 3597-3639 (1968)

[2]: L. McDonagh, R. Wallenstein, "Low-noise 62 W CW intracavity-doubled TEM$_{00}$ Nd:YVO$_4$ green laser pumped at 888 nm," Opt. Lett. 32, 802-804 (2007)

[3]: S. Popov. "7: Fiber laser overview and medical applications" in F. J. Duarte, Tunable Laser Applications (2nd ed.) New York, CRC (2009).

[4]: S. I. Kablukov, E. I. Dontsova, V. A. Akulov, A. A. Vlasov, S. A. Babin, "Frequency doubling of Yb-doped fiber laser to 515 nm", Laser Phys 20(2), 360-364 (2010)

[5]: A. Ashkin, G. Boyd, J. Dziedzic, "Resonant optical second harmonic generation and mixing," IEEE J. Quantum Elect., 2(6), 109-124 (1966)

[6]: T. Sudmeyer, Y. Imai, H. Masuda, N. Eguchi, M. Saito, S. Kubota, "Efficient 2nd and 4th harmonic generation of a single-frequency, continuous-wave fiber amplifier," Opt. Express 16, 1546-1551 (2008)

[7]: W. J. Kozlovsky, W. P. Risk, W. Lenth, B. G. Kim, G. L. Bona, H. Jaeckel, D. J. Webb, "Blue light generation by resonator-enhanced frequency doubling of an extended-cavity diode laser," Appl. Phys. Lett., 65(5), 525-527 (1994)

[8]: P. G. Wigley, Q. Zhang, E. Miesak, G. J. Dixon, "High-power 467-nm passively locked signal-resonant sum-frequency laser," Opt. Lett. 20, 2496-2498 (1995)

[9]: J. Koplow, D. Kliner, and L. Goldberg, "Single-mode operation of a coiled multi-mode fiber amplifier," Opt. Lett. 25, 442-444 (2000)

[10]: M. Fermann, "Single-mode excitation of multi-mode fibers with ultrashort pulses," Opt. Lett. 23, 52-54 (1998)

What is claimed is:

1. A device comprising:
    a portion of optical fiber providing an amplifying medium;
    a first resonant cavity containing the portion of optical fiber and having a frequency selective element which limits the frequency band of the first resonant cavity to cover a subset of axial modes of the first resonant cavity;
    a second resonant cavity arranged in the first resonant cavity and having a transmission response that includes a plurality of transmission bands within the frequency band of the first resonant cavity, so that there are a plurality of axial modes which lie within both the frequency band of the first resonant cavity and at least two of the transmission bands of the second resonant cavity, wherein the second resonant cavity is configured to increase intracavity power within the second resonant cavity to a power output that is higher relative to a power outputted from the optical fiber, and wherein the second resonant cavity includes a plurality of mirrors arranged within the second resonant cavity for circulating light received from the first resonant cavity within the second resonant cavity, at least one of the plurality of mirrors being curved;

a pump source having an output directed to excite light within the first frequency band from the amplifying medium and induce lasing at multiple ones of said plurality of axial modes that lie within both the frequency band of the first resonant cavity and the transmission bands of the second resonant cavity, wherein the second resonant cavity has arranged therein a non-linear optical medium which supports a frequency mixing process in the second resonant cavity.

2. A device according to claim 1, wherein the first resonant cavity is a linear cavity bounded by a first reflector and a second reflector.

3. A device according to claim 1, wherein the first resonant cavity is a ring cavity.

4. A device according to claim 2, wherein the frequency selective element comprises a grating.

5. A device according to claim 2, wherein the frequency selective element comprises a filter.

6. A device according to claim 1, wherein the optical fiber is single mode.

7. A device according to claim 1, wherein the optical fiber is multi-mode comprising a fundamental mode and at least one higher order mode.

8. A device according to claim 7, wherein the first resonant cavity is a linear cavity bounded by a first reflector and a second reflector, the first reflector being a fiber Bragg grating written into the optical fiber and having a mode-dependent effective period, and the second reflector being a volume Bragg grating having a period matched to the effective period of the fiber Bragg grating for the fundamental mode so that lasing is restricted to the fundamental mode.

9. A device according to claim 7, wherein the multi-mode output of the optical fiber at the end optically adjacent to the second resonant cavity is spatially matched to the fundamental transverse mode $TEM_{00}$ of the second resonant cavity so that the first resonant cavity is resonant for multi-mode amplification in the optical fiber.

10. A device according to claim 1, wherein each transmission band of the second resonant cavity has a width greater than the separation between the standing wave modes of the first resonant cavity.

11. A device according to claim 1, wherein the optical fiber is doped with active laser ions, thereby to provide the amplifying medium.

12. A device according to claim 1, wherein the optical fiber has a vibrational mode with a Stokes energy bridging the energy difference between the pump frequency band and the first frequency band, so that stimulated Raman scattering generates gain in the first frequency band, thereby to provide the amplifying medium.

13. A device according to claim 12, comprising a further pump source which acts as a pump for said pump source.

* * * * *